United States Patent
Nims et al.

(10) Patent No.: US 12,501,015 B2
(45) Date of Patent: *Dec. 16, 2025

(54) 2D IMAGE CAPTURE SYSTEM AND DISPLAY OF 3D DIGITAL IMAGE

(71) Applicants: Jerry Nims, Sandy Springs, GA (US); William M. Karszes, Hilton Head, SC (US); Samuel Pol, Lawrenceville, GA (US)

(72) Inventors: Jerry Nims, Sandy Springs, GA (US); William M. Karszes, Hilton Head, SC (US); Samuel Pol, Lawrenceville, GA (US)

( * ) Notice: Subject to any disclaimer, the term of this patent is extended or adjusted under 35 U.S.C. 154(b) by 93 days.

This patent is subject to a terminal disclaimer.

(21) Appl. No.: 18/611,420

(22) Filed: Mar. 20, 2024

(65) Prior Publication Data

US 2024/0236285 A1  Jul. 11, 2024

Related U.S. Application Data

(63) Continuation of application No. 18/415,371, filed on Jan. 17, 2024, which is a continuation of application
(Continued)

(51) Int. Cl.
*H04N 13/243* (2018.01)
*H04N 13/128* (2018.01)
(Continued)

(52) U.S. Cl.
CPC ......... *H04N 13/243* (2018.05); *H04N 13/128* (2018.05); *H04N 13/156* (2018.05);
(Continued)

(58) Field of Classification Search
CPC ............ H04N 13/243; H04N 5/23222; H04N 13/128; H04N 13/156; H04N 13/271;
(Continued)

(56) References Cited

U.S. PATENT DOCUMENTS 8,780,174 B1 * 7/2014 Rawdon .............. H04N 23/683
348/43
D877,802 S * 3/2020 Elliott ......................... D16/237
(Continued)

*Primary Examiner* — Tung T Vo
(74) *Attorney, Agent, or Firm* — Mathew L. Grell, Esq.; Grell & Watson Patent Attorneys LLC

(57) ABSTRACT

A system to capture a plurality of two dimensional digital source images of a scene by a user, including a smart device having a memory device for storing an instruction, a processor in communication with the memory and configured to execute the instruction, a plurality of digital image capture devices in communication with the processor and each image capture device configured to capture a digital image of the scene, the plurality of digital image capture devices positioned linearly in series within approximately an interpupillary distance, wherein a first digital image capture devices is centered proximate a first end of the interpupillary distance, a second digital image capture devices is centered on a second end of the interpupillary distance, and any remaining the plurality of digital image capture devices are evenly spaced therebetween, and a display in communication with the processor, the display configured to display a multidimensional digital image.

19 Claims, 20 Drawing Sheets

Related U.S. Application Data

No. 17/333,721, filed on May 28, 2021, now Pat. No. 11,917,119, which is a continuation-in-part of application No. 29/778,683, filed on Apr. 14, 2021, now abandoned, and a continuation-in-part of application No. 29/733,453, filed on May 1, 2020, now abandoned, and a continuation-in-part of application No. 29/728,152, filed on Mar. 16, 2020, now abandoned, and a continuation-in-part of application No. 29/726,221, filed on Mar. 2, 2020, now abandoned, and a continuation-in-part of application No. 29/720,105, filed on Jan. 9, 2020, now abandoned.

(60) Provisional application No. 63/105,486, filed on Oct. 26, 2020, provisional application No. 63/043,761, filed on Jun. 24, 2020, provisional application No. 63/033,889, filed on Jun. 3, 2020.

(51) Int. Cl.
| | | |
|---|---|---|
| *H04N 13/156* | (2018.01) | |
| *H04N 13/271* | (2018.01) | |
| *H04N 13/296* | (2018.01) | |
| *H04N 13/302* | (2018.01) | |
| *H04N 13/398* | (2018.01) | |
| *H04N 23/60* | (2023.01) | |

(52) U.S. Cl.
CPC ......... *H04N 13/271* (2018.05); *H04N 13/296* (2018.05); *H04N 13/302* (2018.05); *H04N 13/398* (2018.05); *H04N 23/64* (2023.01)

(58) Field of Classification Search
CPC .. H04N 13/296; H04N 13/302; H04N 13/398; H04N 5/232941; H04N 5/2258
USPC .......................................................... 348/43
See application file for complete search history.

(56) References Cited

U.S. PATENT DOCUMENTS

| | | | | |
|---|---|---|---|---|
| 2014/0092329 | A1* | 4/2014 | Odake | H04N 13/305 |
| | | | | 349/15 |
| 2021/0392314 | A1* | 12/2021 | Nims | G06F 1/1686 |
| 2022/0017016 | A1* | 1/2022 | Slama | B60R 11/0235 |

* cited by examiner

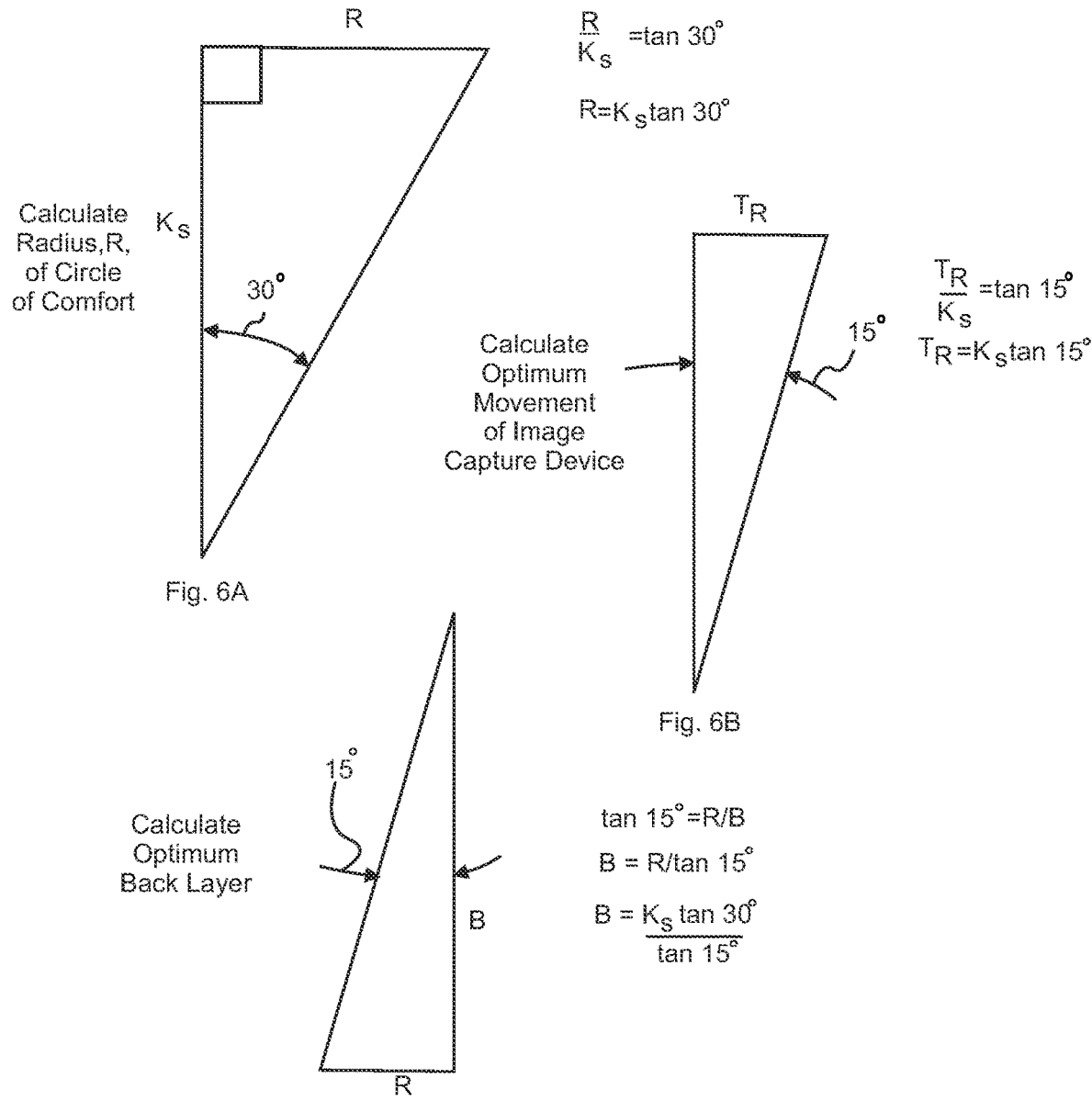

2D IMAGE CAPTURE SYSTEM AND DISPLAY OF 3D DIGITAL IMAGE

CROSS REFERENCE TO RELATED APPLICATIONS

To the full extent permitted by law, the present United States Non-Provisional Patent Application is a continuation of U.S. Non-Provisional application Ser. No. 18/415,371, filed Jan. 17, 2024, entitled "2D IMAGE CAPTURE SYSTEM & DISPLAY OF 3D DIGITAL IMAGE", which is a continuation of U.S. Pat. No. 11,917,119, issued Feb. 27,2024, entitled "2D IMAGE CAPTURE SYSTEM, TRANSMISSION & DISPLAY OF 3D DIGITAL IMAGE". The foregoing is incorporated herein by reference in their entirety.

FIELD OF THE DISCLOSURE

The present disclosure is directed to 2D image capture, image processing, and display of a 3D or multi-dimensional image.

BACKGROUND

The human visual system (HVS) relies on two dimensional images to interpret three dimensional fields of view. By utilizing the mechanisms with the HVS we create images/scenes that are comparable with the HVS.

Mismatches between the point at which the eyes must converge and the distance to which they must focus when viewing a 3D image have negative consequences. While 3D imagery has proven popular and useful for movies, digital advertising, many other applications may be utilized if viewers are enabled to view 3D images without wearing specialized glasses or a headset, which is a well-known problem. Misalignment in these systems results in jumping images, out of focus, or fuzzy features when viewing the digital multidimensional images. The viewing of these images can lead to headaches and nausea.

In natural viewing, images arrive at the eyes with varying binocular disparity, so that as viewers look from one point in the visual scene to another, they must adjust their eyes' vergence. The distance at which the lines of sight intersect is the vergence distance. Failure to converge at that distance results in double images. The viewer also adjusts the focal power of the lens in each eye (i.e., accommodates) appropriately for the fixated part of the scene. The distance to which the eye must be focused is the accommodative distance. Failure to accommodate to that distance results in blurred images. Vergence and accommodation responses are coupled in the brain, specifically, changes in vergence drive changes in accommodation and changes in accommodation drive changes in vergence. Such coupling is advantageous in natural viewing because vergence and accommodative distances are nearly always identical.

In 3D images, images have varying binocular disparity thereby stimulating changes in vergence as happens in natural viewing. But the accommodative distance remains fixed at the display distance from the viewer, so the natural correlation between vergence and accommodative distance is disrupted, leading to the so-called vergence-accommodation conflict. The conflict causes several problems. Firstly, differing disparity and focus information cause perceptual depth distortions. Secondly, viewers experience difficulties in simultaneously fusing and focusing on key subject within the image. Finally, attempting to adjust vergence and accommodation separately causes visual discomfort and fatigue in viewers.

Perception of depth is based on a variety of cues, with binocular disparity and motion parallax generally providing more precise depth information than pictorial cues. Binocular disparity and motion parallax provide two independent quantitative cues for depth perception. Binocular disparity refers to the difference in position between the two retinal image projections of a point in 3D space.

Conventional stereoscopic displays forces viewers to try to decouple these processes, because while they must dynamically vary vergence angle to view objects at different stereoscopic distances, they must keep accommodation at a fixed distance or else the entire display will slip out of focus. This decoupling generates eye fatigue and compromises image quality when viewing such displays.

Therefore, it is readily apparent that there is a recognizable unmet need for 2D image capture system & display of 3D or digital multi-dimensional image that may be configured to address at least some aspects of the problems discussed above.

SUMMARY

Briefly described, in an example embodiment, the present disclosure may overcome the above-mentioned disadvantages and may meet the recognized need for A system to capture a plurality of two dimensional digital source images of a scene by a user, including a smart device having a memory device for storing an instruction, a processor in communication with the memory and configured to execute the instruction, a plurality of digital image capture devices in communication with the processor and each image capture device configured to capture a digital image of the scene, the plurality of digital image capture devices positioned linearly in series within approximately an interpupillary distance, wherein a first digital image capture devices is centered proximate a first end of the interpupillary distance, a second digital image capture devices is centered on a second end of the interpupillary distance, and any remaining the plurality of digital image capture devices are evenly spaced therebetween, and a display in communication with the processor, the display configured to display a multidimensional digital image.

Accordingly, a feature of the digital multi-dimensional image system and methods of use is the ability to capture images of a scene with 2D capture devices positioned approximately an intraocular or interpupillary distance width IPD apart (distance between pupils of human visual system).

Accordingly, a feature of the digital multi-dimensional image system and methods of use is the ability to convert input 2D source scenes into multi-dimensional/multi-spectral images. The output image follows the rule of a "key subject point" maintained within an optimum parallax to maintain a clear and sharp image.

Accordingly, a feature of the digital multi-dimensional image system and methods of use is the ability to integrate viewing devices or other viewing functionality into the display, such as barrier screen, lenticular, arced, curved, trapezoid, parabolic, overlays, waveguides, black line and the like with an integrated LCD layer in an LED or OLED, LCD, OLED, and combinations thereof or other viewing devices.

Another feature of the digital multi-dimensional image platform based system and methods of use is the ability to produce digital multi-dimensional images that can be viewed on viewing screens, such as mobile and stationary phones, smart phones (including iPhone), tablets, computers, laptops, monitors and other displays and/or special output devices, directly without 3D glasses or a headset.

In an exemplary embodiment a system to capture a plurality of two dimensional digital source images of a scene by a user, including a smart device having a memory device for storing an instruction, a processor in communication with the memory and configured to execute the instruction, a plurality of digital image capture devices in communication with the processor and each image capture device configured to capture a digital image of the scene, the plurality of digital image capture devices positioned linearly in series within approximately an interpupillary distance, wherein a first digital image capture devices is centered proximate a first end of the interpupillary distance, a second digital image capture devices is centered on a second end of the interpupillary distance, and any remaining the plurality of digital image capture devices are evenly spaced therebetween, and a display in communication with the processor, the display configured to display a multidimensional digital image.

In another exemplary embodiment of a system to capture a plurality of two dimensional digital source images of a scene and transmit a modified pair of images to a plurality of users for viewing, having a first smart device having a first memory device for storing an instruction, a first processor in communication with the first memory device and configured to execute the instruction, a display in communication with the first processor, the display configured to display a multidimensional digital image, a second smart device having a second memory device for storing an instruction, a second processor in communication with the second memory device and configured to execute the instruction, a plurality of digital image capture devices in communication with the second processor and each image capture device configured to capture a digital image of the scene, the plurality of digital image capture devices positioned linearly in series within approximately an interpupillary distance width, wherein a first digital image capture devices is centered proximate a first end of the interpupillary distance width, a second digital image capture devices is centered on a second end of the interpupillary distance width, and any remaining the plurality of digital image capture devices are evenly spaced therebetween, and the second smart device in communication with the first smart device In another exemplary embodiment of a method of generating a multidimensional digital image of a scene from at least two 2D (two dimensional) digital images for a user, including providing a smart device having a memory device for storing an instruction, a processor in communication with the memory and configured to execute the instruction, a plurality of digital image capture devices in communication with the processor and each image capture device configured to capture a digital image of the scene, the plurality of digital image capture devices positioned linearly in series within approximately an interpupillary distance, wherein a first digital image capture devices is centered proximate a first end of the interpupillary distance, a second digital image capture devices is centered on a second end of the interpupillary distance, and any remaining the plurality of digital image capture devices are evenly spaced therebetween, and a display in communication with the processor, the display configured to display the multidimensional digital image and displaying the multidimensional digital image on the display.

A feature of the present disclosure may include a system having a series of capture devices, such as two, three, four or more, such plurality of capture devices (digital image cameras) positioned in series linearly within an intraocular or interpupillary distance width, the distance between an average human's pupils, the system captures and stores two, three, four or more, a plurality of 2D source images of a scene, the system labels and identifies the images based on the source capture device that captured the image.

A feature of the present disclosure may include a system having a display device configured from a stack of components, such as top glass cover, capacitive touch screen glass, polarizer, diffusers, and backlight. Moreover, an image source, such as LCD, such LED, ELED, PDP, QLED, and other types of display technologies. Furthermore, display device may include a lens array preferably positioned between capacitive touch screen glass and LCD panel stack of components, and configured to bend or refract light in a manner capable of displaying both a high quality 2D image and an interlaced stereo pair of left and right images as 3D or multidimensional digital image of scene.

A feature of the present disclosure may include other techniques to bend or refract light, such as barrier screen, lenticular, parabolic, overlays, waveguides, black line and the like.

A feature of the present disclosure may include a lens array having a cross-sectional view configured as a series of spaced apart trapezoid shaped lens.

A feature of the present disclosure is the ability to overcome the above defects via another important parameter to determine the convergence point or key subject point, since the viewing of an image that has not been aligned to a key subject point causes confusion to the human visual system and results in blur and double images.

A feature of the present disclosure is the ability to overcome the above defects via another important parameter to determine Circle of Comfort CoC, since the viewing of an image that has not been aligned to the Circle of Comfort CoC causes confusion to the human visual system and results in blur and double images.

A feature of the present disclosure is the ability to overcome the above defects via another important parameter to determine Circle of Comfort CoC fused with Horopter arc or points and Panum area, since the viewing of an image that has not been aligned to the Circle of Comfort CoC fused with Horopter arc or points and Panum area causes confusion to the human visual system and results in blur and double images.

A feature of the present disclosure is the ability to overcome the above defects via another important parameter to determine gray scale depth map, the system interpolates intermediate points based on the assigned points (closest point, key subject point, and furthest point) in a scene, the system assigns values to those intermediate points and renders the sum to a gray scale depth map. The gray scale map to generate volumetric parallax using values assigned to the different points (closest point, key subject point, and furthest point) in a scene. This modality also allows volumetric parallax or rounding to be assigned to singular objects within a scene.

A feature of the present disclosure is its ability to utilize a key subject algorithm to manually or automatically select the key subject of a scene displayed on a display.

A feature of the present disclosure is its ability to utilize an image alignment or edit algorithm to manually or automatically align two images of a scene for display.

A feature of the feature of the present disclosure is its ability to utilize an image translation algorithm to align the key subject point of two images of a scene for display.

A feature of the present disclosure is its ability to provide a display capable of displaying a multi-dimensional image using a lens array integrated therein the display wherein such lens array may be selected from the barrier screens, parabolic, lens array (whether arced, dome, trapezoid or the like), and/or waveguide, integrated LCD layer in an LED or OLED, LCD, OLED, and combinations thereof.

These and other features of the a 2D image capture system & display of 3D or digital multi-dimensional image and methods of use will become more apparent to one skilled in the art from the prior Summary and following Brief Description of the Drawings, Detailed Description of exemplary embodiments thereof, and Claims when read in light of the accompanying Drawings or Figures.

BRIEF DESCRIPTION OF THE DRAWINGS

The present disclosure will be better understood by reading the Detailed Description of the Preferred and Selected Alternate Embodiments with reference to the accompanying drawing Figures, in which like reference numerals denote similar structure and refer to like elements throughout, and in which:

FIG. 5B is a cross-section diagram of an exemplary embodiment of an arced or curved shaped lens according to select embodiments of the instant disclosure, tracing RGB light there through;

FIG. 5C is a cross-section diagram of a prototype embodiment of a trapezoid shaped lens according to select embodiments of the instant disclosure, tracing RGB light there through;

FIG. 5D is a cross-section diagram of an exemplary embodiment of a dome shaped lens according to select embodiments of the instant disclosure, tracing RGB light there through;

FIG. 6A is a top view illustration of an exemplary embodiment identifying right triangles to calculate the radius of the Circle of Comfort of FIG. 6;

FIG. 6B is a top view illustration of an exemplary embodiment identifying right triangles to calculate linear positioning of capture devices on lens plane of FIG. 6;

FIG. 6C is a top view illustration of an exemplary embodiment identifying right triangles to calculate the optimum distance of backplane of FIG. 6;

Figure 1:
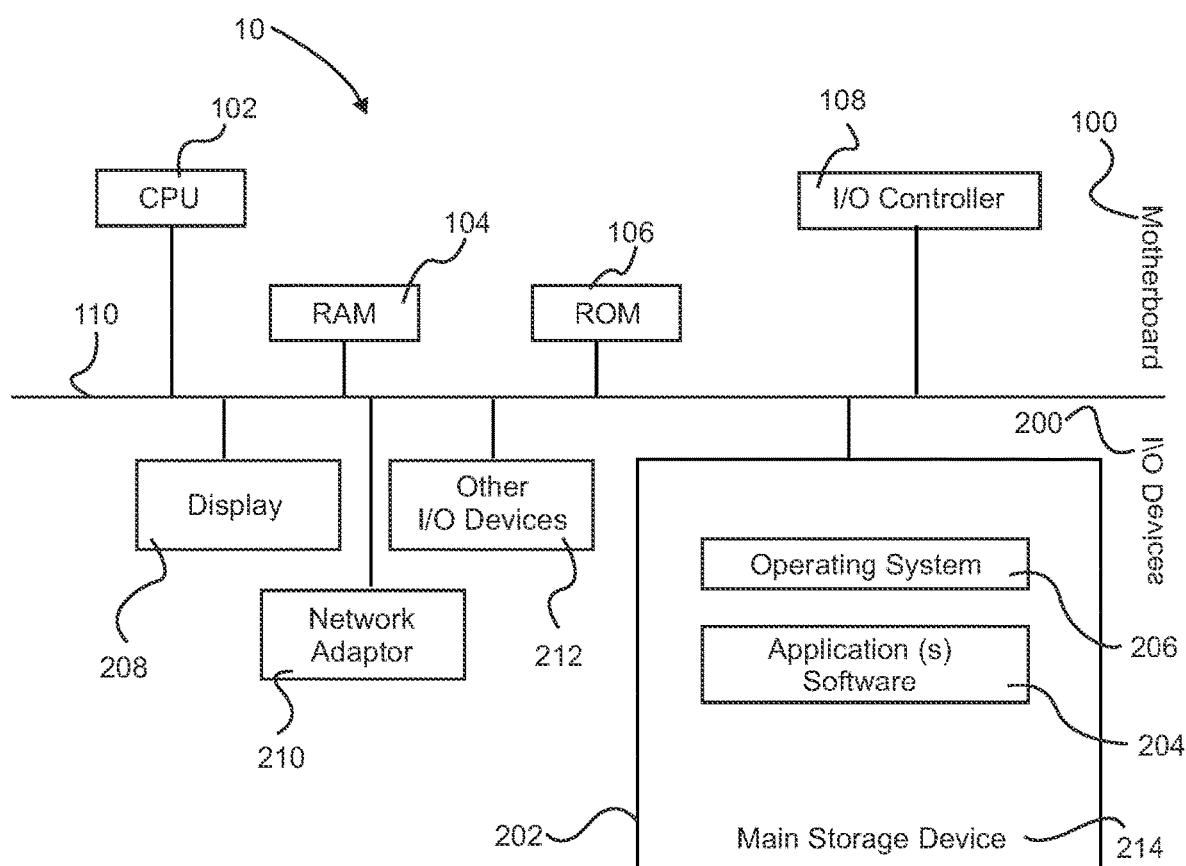
FIG. 1 is a block diagram of a computer system of the present disclosure.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

In describing the exemplary embodiments of the present disclosure, as illustrated in figures specific terminology is employed for the sake of clarity. The present disclosure, however, is not intended to be limited to the specific terminology so selected, and it is to be understood that each specific element includes all technical equivalents that operate in a similar manner to accomplish similar functions. The claimed invention may, however, be embodied in many different forms and should not be construed to be limited to the embodiments set forth herein. The examples set forth herein are non-limiting examples and are merely examples among other possible examples.

In order to understand the present disclosure certain variables need to be defined. The object field is the entire image being composed. The "key subject point" is defined as the point where the scene converges, i.e., the point in the depth of field that always remains in focus and has no parallax differential in the key subject point. The foreground and background points are the closest point and furthest point from the viewer, respectively. The depth of field is the depth or distance created within the object field (depicted distance from foreground to background). The principal axis is the line perpendicular to the scene passing through the key subject point. The parallax or binocular disparity is the difference in the position of any point in the first and last image after the key subject alignment. In digital composition, the key subject point displacement from the principal axis between frames is always maintained as a whole integer number of pixels from the principal axis. The total parallax is the summation of the absolute value of the displacement of the key subject point from the principal axis in the closest frame and the absolute value of the displacement of the key subject point from the principal axis in the furthest frame.

When capturing images herein, applicant refers refer to depth of field or circle of confusion and circle of comfort is referred to when viewing image on the viewing device.

Documents

Three-Dimensional Display Technology, pages 1-80, by Jason Geng is incorporated by reference herein.

U.S. Pat. Nos. 9,992,473, 10,033,990, and 10,178,247 are incorporated herein by reference in their entirety.

Creating depth perception using motion parallax is known. However, in order to maximize depth while maintaining a pleasing viewing experience, a systematic approach is introduced. The system combines factors of the human visual system with image capture procedures to produce a realistic depth experience on any 2D viewing device.

The technique introduces the Circle of Comfort CoC that prescribe the location of the image capture system relative to the scene S. The Circle of Comfort CoC relative to the Key Subject KS (point of convergence, focal point) sets the optimum near plane and far plane, i.e., controls the parallax of the scene S.

The system was developed so any capture device such as iPhone, camera or video camera can be used to capture the scene. Similarly, the captured images can be combined and viewed on any digital output device such as smart phone, tablet, monitor, TV, laptop, or computer screen.

As will be appreciated by one of skill in the art, the present disclosure may be embodied as a method, data processing system, or computer program product. Accordingly, the present disclosure may take the form of an entirely hardware embodiment, entirely software embodiment or an embodiment combining software and hardware aspects. Furthermore, the present disclosure may take the form of a computer program product on a computer-readable storage medium having computer-readable program code means embodied in the medium. Any suitable computer readable medium may be utilized, including hard disks, ROM, RAM, CD-ROMs, electrical, optical, magnetic storage devices and the like.

The present disclosure is described below with reference to flowchart illustrations of methods, apparatus (systems) and computer program products according to embodiments of the present disclosure. It will be understood that each block or step of the flowchart illustrations, and combinations of blocks or steps in the flowchart illustrations, can be implemented by computer program instructions or operations. These computer program instructions or operations may be loaded onto a general purpose computer, special purpose computer, or other programmable data processing apparatus to produce a machine, such that the instructions or operations, which execute on the computer or other programmable data processing apparatus, create means for implementing the functions specified in the flowchart block or blocks/step or steps.

These computer program instructions or operations may also be stored in a computer-usable memory that can direct a computer or other programmable data processing apparatus to function in a particular manner, such that the instructions or operations stored in the computer-usable memory produce an article of manufacture including instruction means which implement the function specified in the flowchart block or blocks/step or steps. The computer program instructions or operations may also be loaded onto a computer or other programmable data processing apparatus (processor) to cause a series of operational steps to be performed on the computer or other programmable apparatus (processor) to produce a computer implemented process such that the instructions or operations which execute on the computer or other programmable apparatus (processor) provide steps for implementing the functions specified in the flowchart block or blocks/step or steps.

Accordingly, blocks or steps of the flowchart illustrations support combinations of means for performing the specified functions, combinations of steps for performing the specified functions, and program instruction means for performing the specified functions. It should also be understood that each block or step of the flowchart illustrations, and combinations of blocks or steps in the flowchart illustrations, can be implemented by special purpose hardware-based computer systems, which perform the specified functions or steps, or combinations of special purpose hardware and computer instructions or operations.

Computer programming for implementing the present disclosure may be written in various programming languages, database languages, and the like. However, it is understood that other source or object oriented programming languages, and other conventional programming language may be utilized without departing from the spirit and intent of the present disclosure.

Referring now to FIG. 1, there is illustrated a block diagram of a computer system 10 that provides a suitable environment for implementing embodiments of the present disclosure. The computer architecture shown in FIG. 1 is divided into two parts—motherboard 100 and the input/output (I/O) devices 200. Motherboard 100 preferably includes subsystems or processor to execute instructions such as central processing unit (CPU) 102, a memory device, such as random access memory (RAM) 104, input/output (I/O) controller 108, and a memory device such as read-only memory (ROM) 106, also known as firmware, which are interconnected by bus 110. A basic input output system (BIOS) containing the basic routines that help to transfer information between elements within the subsystems of the computer is preferably stored in ROM 106, or operably disposed in RAM 104. Computer system 10 further preferably includes I/O devices 202, such as main storage device 214 for storing operating system 204 and executes as instruction via application program(s) 206, and display 208 for visual output, and other I/O devices 212 as appropriate.

Main storage device 214 preferably is connected to CPU 102 through a main storage controller (represented as 108) connected to bus 110. Network adapter 210 allows the computer system to send and receive data through communication devices or any other network adapter capable of transmitting and receiving data over a communications link that is either a wired, optical, or wireless data pathway. It is recognized herein that central processing unit (CPU) 102 performs instructions, operations or commands stored in ROM 106 or RAM 104.

It is contemplated herein that computer system 10 may include smart devices, such as smart phone, iphone, android phone (Google, Samsung, or other manufactures), tablets, desktops, laptops, digital image capture devices, and other computing devices with two or more digital image capture devices and/or 3D display 208 (smart device).

It is further contemplated herein that display 208 may be configured as a foldable display or multi-foldable display capable of unfolding into a larger display surface area.

Many other devices or subsystems or other I/O devices 212 may be connected in a similar manner, including but not limited to, devices such as microphone, speakers, flash drive, CD-ROM player, DVD player, printer, main storage device 214, such as hard drive, and/or modem each connected via an I/O adapter. Also, although preferred, it is not necessary for all of the devices shown in FIG. 1 to be present to practice the present disclosure, as discussed below. Furthermore, the devices and subsystems may be interconnected in different configurations from that shown in FIG. 1, or may be based on optical or gate arrays, or some combination of these elements that is capable of responding to and executing instructions or operations. The operation of a computer system such as that shown in FIG. 1 is readily known in the art and is not discussed in further detail in this application, so as not to overcomplicate the present discussion.

Figure 2:
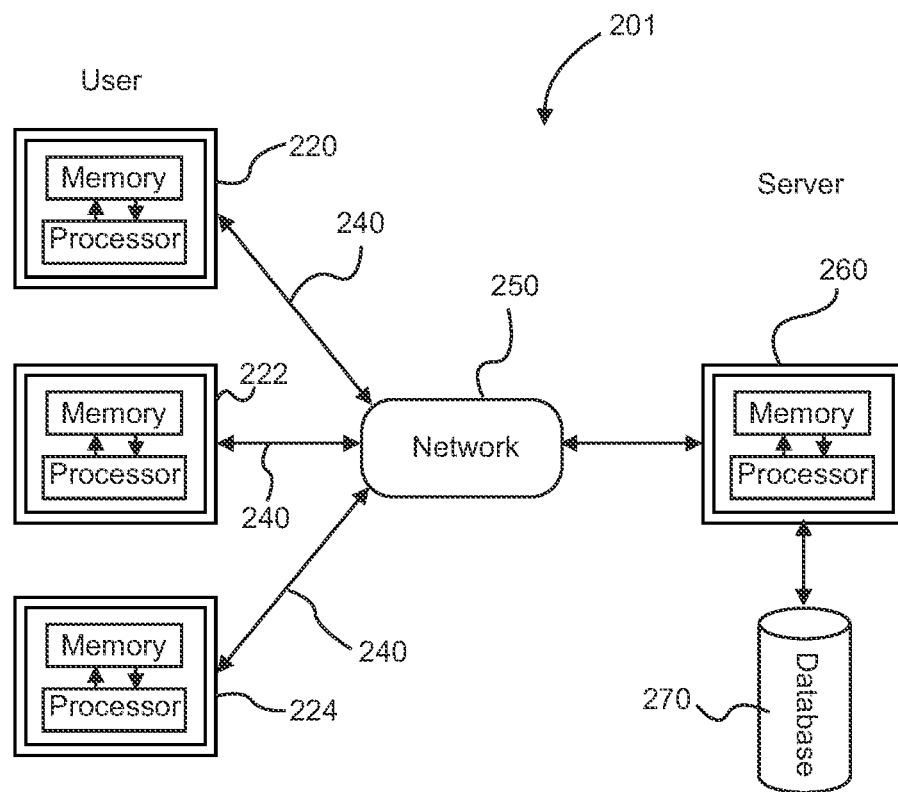
FIG. 2 is a block diagram of a communications system implemented by the computer system in FIG. 1.

Referring now to FIG. 2, there is illustrated a diagram depicting an exemplary communication system 201 in which concepts consistent with the present disclosure may be implemented. Examples of each element within the communication system 201 of FIG. 2 are broadly described above with respect to FIG. 1. In particular, the server system 260 and user system 220 have attributes similar to computer system 10 of FIG. 1 and illustrate one possible implementation of computer system 10. Communication system 201 preferably includes one or more user systems 220, 222, 224 (It is contemplated herein that computer system 10 may include smart devices, such as smart phone, iphone, android phone (Google, Samsung, or other manufactures), tablets, desktops, laptops, cameras, and other computing devices with display 208 (smart device)), one or more server system 260, and network 250, which could be, for example, the Internet, public network, private network or cloud. User systems 220-224 each preferably includes a computer-readable medium, such as random access memory, coupled to a processor. The processor, CPU 102, executes program instructions or operations stored in memory. Communication system 201 typically includes one or more user system 220. For example, user system 220 may include one or more general-purpose computers (e.g., personal computers), one or more special purpose computers (e.g., devices specifically programmed to communicate with each other and/or the server system 260), a workstation, a server, a device, a digital assistant or a "smart" cellular telephone or pager, a digital camera, a component, other equipment, or some combination of these elements that is capable of responding to and executing instructions or operations.

Similar to user system 220, server system 260 preferably includes a computer-readable medium, such as random access memory, coupled to a processor. The processor executes program instructions stored in memory. Server system 260 may also include a number of additional external or internal devices, such as, without limitation, a mouse, a CD-ROM, a keyboard, a display, a storage device and other attributes similar to computer system 10 of FIG. 1. Server system 260 may additionally include a secondary storage element, such as database 270 for storage of data and information. Server system 260, although depicted as a single computer system, may be implemented as a network of computer processors. Memory in server system 260 contains one or more executable steps, program(s), algorithm(s), or application(s) 206 (shown in FIG. 1). For example, the server system 260 may include a web server, information server, application server, one or more general-purpose computers (e.g., personal computers), one or more special purpose computers (e.g., devices specifically programmed to communicate with each other), a workstation or other equipment, or some combination of these elements that is capable of responding to and executing instructions or operations.

Communications system 201 is capable of delivering and exchanging data (including three dimensional 3D image files) between user system 220 and a server system 260 through communications link 240 and/or network 250. Through user system 220, users can preferably communicate data over network 250 with each other user system 220, 222, 224, and with other systems and devices, such as server system 260, to electronically transmit, store, print and/or view multidimensional digital master image(s) 303 (see FIG. 7). Communications link 240 typically includes network 250 making a direct or indirect communication between the user system 220 and the server system 260, irrespective of physical separation. Examples of a network 250 include the Internet, cloud, analog or digital wired and wireless networks, radio, television, cable, satellite, and/or any other delivery mechanism for carrying and/or transmitting data or other information, such as to electronically transmit, store, print and/or view multidimensional digital master image(s) 303. The communications link 240 may include, for example, a wired, wireless, cable, optical or satellite communication system or other pathway.

Figure 3A:
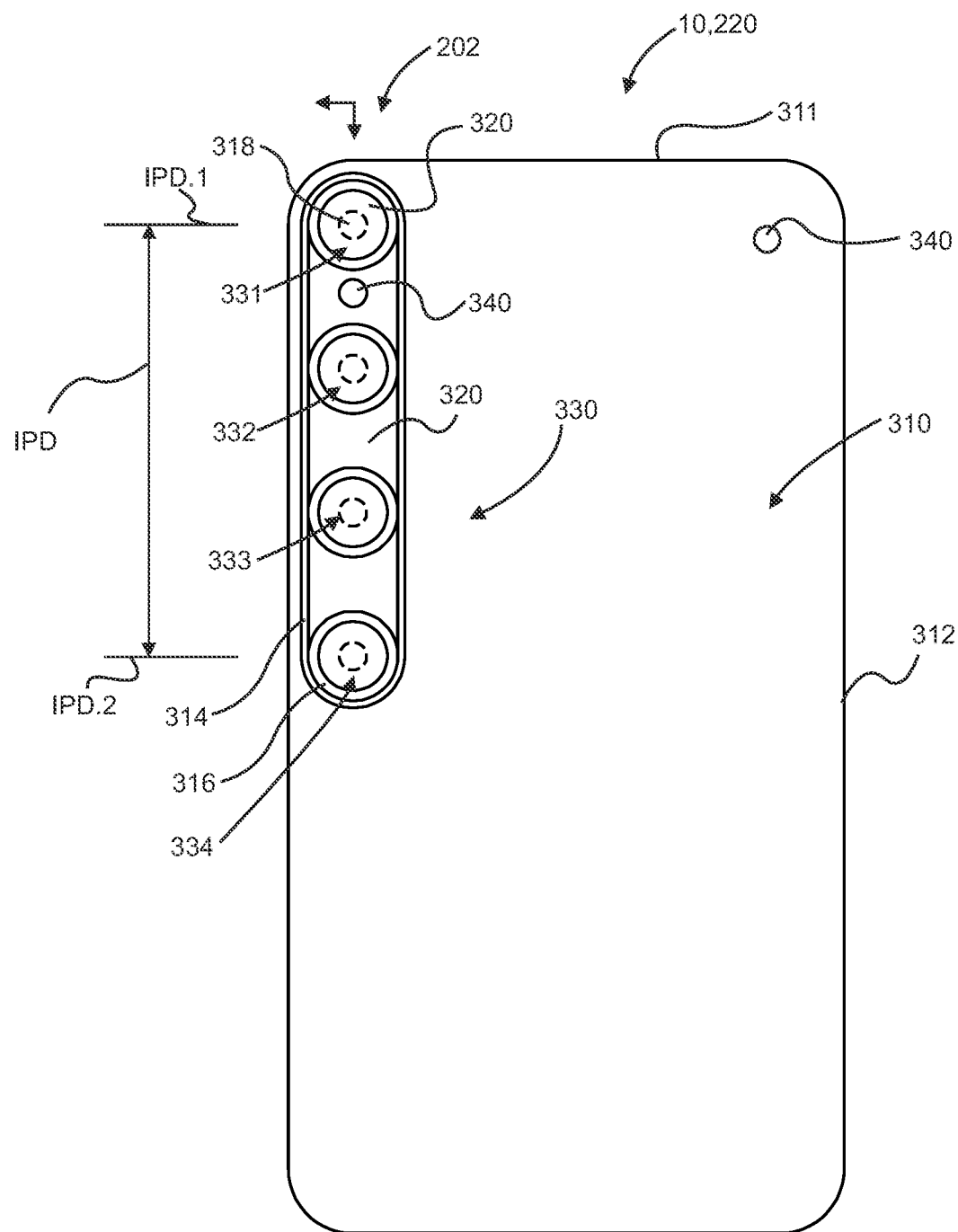
FIG. 3A is a diagram of an exemplary embodiment of a computing device with four image capture devices positioned vertically in series linearly within an intraocular or interpupillary distance width, the distance between an average human's pupils.

Referring now to FIG. 3A, by way of example, and not limitation, there is illustrated a computer system 10, such as smart device or portable smart device having back side 310, a first edge, such as short edge 311 and a second edge, such as long edge 312. Back side 310 may include I/O devices 202, such as an exemplary embodiment of image capture module 330 and one or more sensors 340 to measure distance between computer system 10 and selected depths in an image or scene (depth). Image capture module 330 may include a plurality or four digital image capture devices 331, 332, 333, 334 with four digital image capture devices (positioned vertically, in series linearly within an intraocular or interpupillary distance width IPD (distance between pupils of human visual system within a Circle of Comfort relationship to optimize digital multi-dimensional images for the human visual system) as to back side 310 or proximate and parallel thereto long edge 312. Interpupillary distance width IPD is preferably the distance between an average human's pupils may have a distance between approximately two and a half inches, 2.5 inches (6.35 cm), more preferably between approximately 40-80 mm, the vast majority of adults have IPDs in the range 50-75 mm, the wider range of 45-80 mm is likely to include (almost) all adults, and the minimum IPD for children (down to five years old) is around 40 mm). It is contemplated herein that plurality of image capture modules 330 and one or more sensors 340 may be configured as combinations of image capture device 330 and sensor 340 configured as an integrated unit or module where sensor 340 controls or sets the depth of image capture device 330, whether different depths in scene S, such as foreground, and person P or object, background, such as closest point CP, key subject point KS, and a furthest point FP, shown in FIG. 7. For reference herein plurality of image capture devices, may include first image capture device 331 centered proximate first end IPD IPD.1 of interpupillary distance width IPD, fourth four image capture device 334 centered proximate second end IPD.2 of interpupillary distance width IPD, and remaining image capture devices second image capture device 332 and third four image capture device 333 evenly spaced therebetween first end IPD IPD.1 and second end IPD.2 of interpupillary distance width IPD.

It is contemplated herein that smart device or portable smart device with a display may be configured as rectangular or square or other like configurations providing a surface area having first edge 311 and second edge 312.

It is contemplated herein that image capture devices 331-334 or image capture module 330 may be surrounded by recessed, stepped, or beveled edge 314, each image capture devices 331-34 may be encircled by recessed, stepped, or beveled ring 316, and image capture devices 331-34 or image capture module 330 may be covered by lens cover 320 with a lens thereunder lens 318.

It is contemplated herein that image capture devices 331-34 may be individual capture devices and not part of image capture module.

It is further contemplated herein that image capture devices 331-34 may be positioned anywhere on back side 310 and generally parallel thereto long edge 312.

Figure 3B:
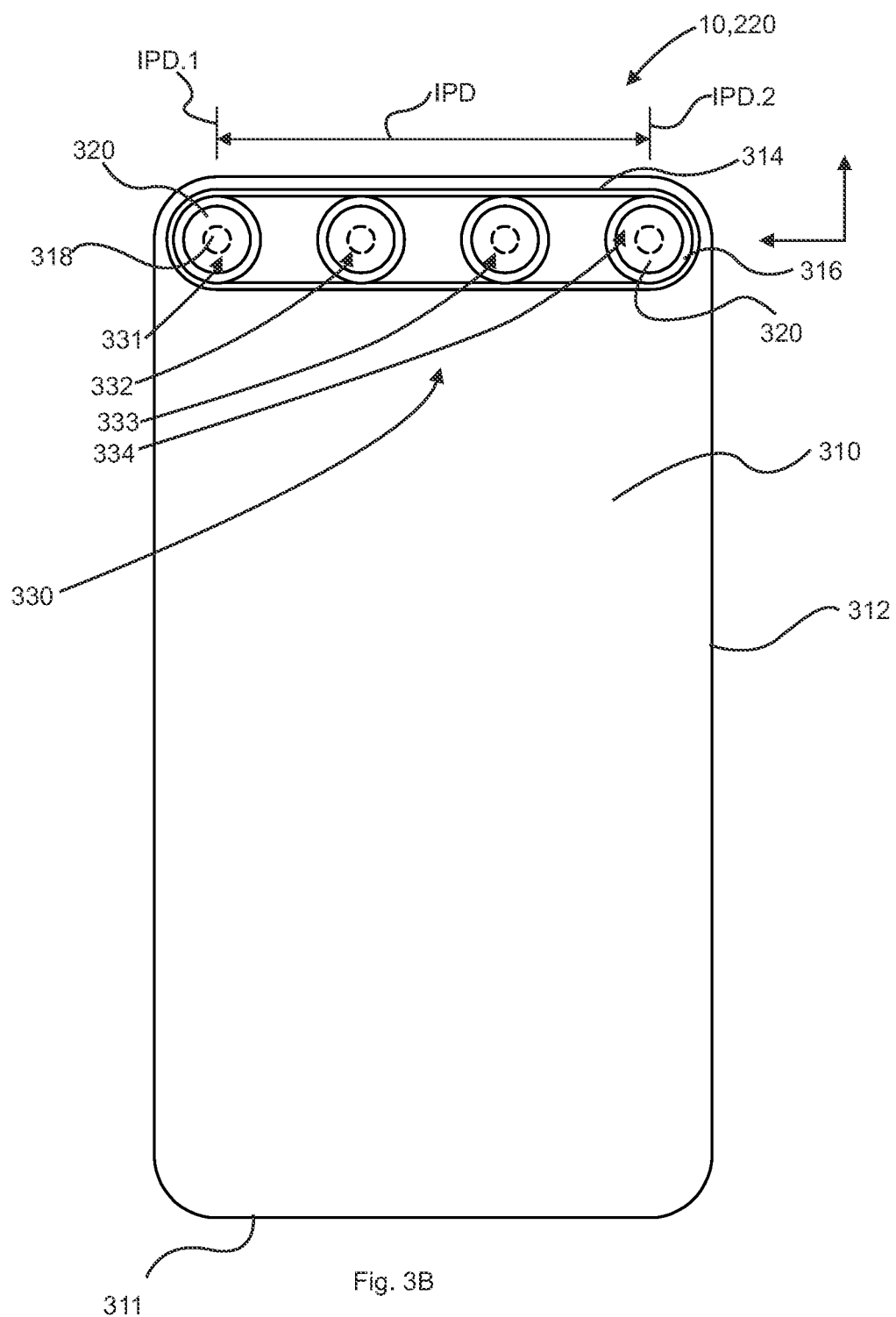
FIG. 3B is a diagram of an exemplary embodiment of a computing device with four image capture devices positioned horizontally in series linearly within an intraocular or interpupillary distance width, the distance between an average human's pupils.

Referring now to FIG. 3B, by way of example, and not limitation, there is illustrated a computer system 10 or other smart device or portable smart device having back side 310, short edge 311 and a long edge 312. Back side 310 may include I/O devices 202, such as an exemplary embodiment of image capture module 330 and one or more sensors 340 to measure distance between computer system 10 and selected depths in an image or scene (depth). Image capture module 330 may include a plurality or four digital image capture devices 331, 332, 333, 334 with four digital image capture devices (positioned vertically, in series linearly within an intraocular or interpupillary distance width IPD (distance between pupils of human visual system within a Circle of Comfort relationship to optimize digital multi-dimensional images for the human visual system) as to back side 310 or proximate and parallel thereto short edge 312. Interpupillary distance width IPD is preferably the distance between an average human's pupils may have a distance between approximately two and a half inches, 2.5 inches (6.35 cm), more preferably between approximately 40-80 mm, the vast majority of adults have IPDs in the range 50-75 mm, the wider range of 45-80 mm is likely to include (almost) all adults, and the minimum IPD for children (down to five years old) is around 40 mm). It is contemplated herein that plurality of image capture modules 330 and one or more sensors 340 may be configured as combinations of image capture device 330 and sensor 340 configured as an integrated unit or module where sensor 340 controls or sets the depth of image capture device 330, such as different depths in scene S, such as foreground, background, and person P or object, such as closest point CP, key subject point KS, and a furthest point FP, shown in FIG. 7. For reference herein plurality of image capture devices, may include first image capture device 331 centered proximate first end IPD IPD.1 of interpupillary distance width IPD, fourth four image capture device 334 centered proximate second end IPD.2 of interpupillary distance width IPD, and remaining image capture devices second image capture device 332 and third four image capture device 333 evenly spaced therebetween first end IPD IPD.1 and second end IPD.2 of interpupillary distance width IPD.

It is contemplated herein that image capture devices 331-34 or image capture module 330 may be surrounded by recessed, stepped, or beveled edge 314, each image capture devices 331-34 may be encircled by recessed, stepped, or beveled ring 316, and image capture devices 331-34 or image capture module 330 may be covered by lens cover 320 with a lens thereunder lens 318.

It is contemplated herein that image capture devices 331-34 may be individual capture devices and not part of image capture module.

It is further contemplated herein that image capture devices 331-34 may be positioned anywhere on back side 310 and generally parallel thereto long edge 312.

With respect to computer system 10 and image capture devices 330, it is to be realized that the optimum dimensional relationships, to include variations in size, materials, shape, form, position, connection, function and manner of operation, assembly and use, are intended to be encompassed by the present disclosure.

Figure 4:
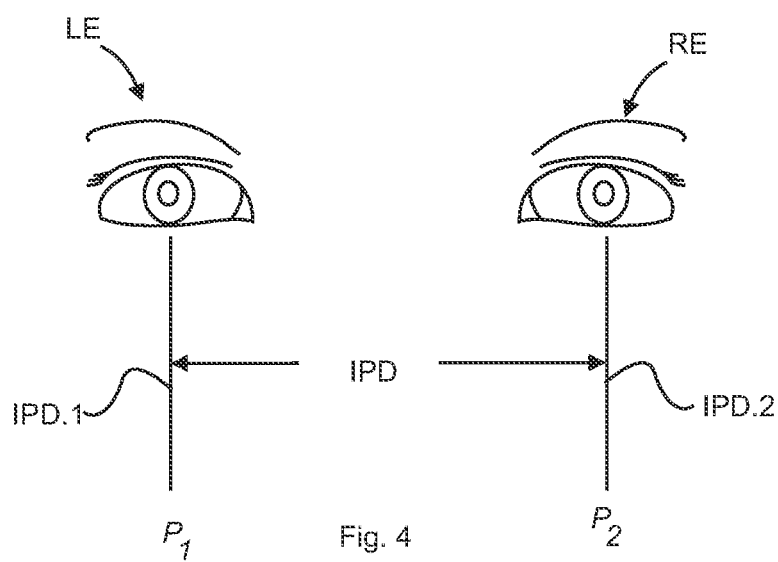
FIG. 4 is a diagram of an exemplary embodiment of human eye spacing the intraocular or interpupillary distance width, the distance between an average human's pupils.

In this disclosure interpupillary distance width IPD may have a measurement of width to position image capture devices 331-334 center-to-center within between approximately maximum width of 115 millimeter to a minimum width of 50 millimeter; more preferably approximately maximum width of 72.5 millimeter to a minimum width of 53.5 millimeter; and most preferably between approximately maximum mean width of 64 millimeter to a minimum mean width of 61.7 millimeter, and an average width of 63 millimeter (2.48 inches) center-to-center width of the human visual system shown in FIG. 4.

Figure 3C:
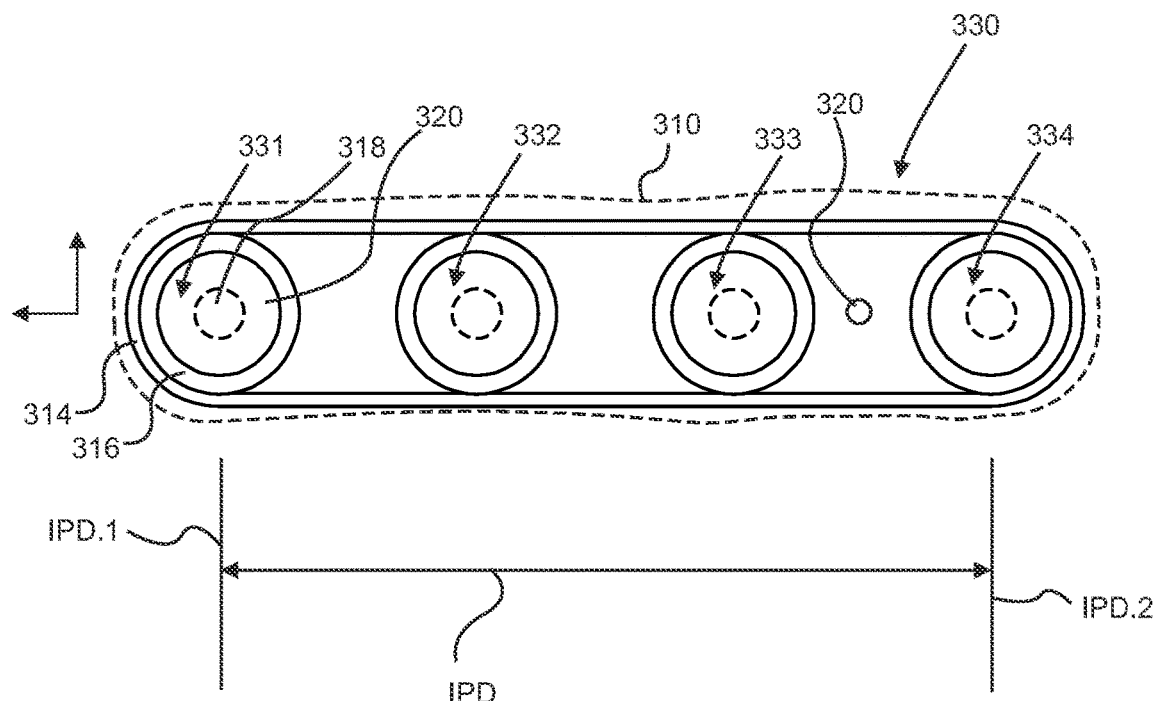
FIG. 3C is an exploded diagram of an exemplary embodiment of the four image capture devices in series linearly of FIGS. 3A and 3B.

Referring now to FIG. 3C, by way of example, and not limitation, there is illustrated an exploded diagram of an exemplary embodiment of image capture module 330. Image capture module 330 may include digital image capture devices 331-334 with four image capture devices in series linearly within an intraocular or interpupillary distance width IPD, the distance between an average human's pupil. Image capture devices 331-334 may include first image capture device 331, second image capture device 332, third image capture device 333, fourth image capture device 334. First image capture device 331 may be centered proximate first end IPD IPD.1 of interpupillary distance width IPD, fourth image capture device 334 may be centered proximate second end IPD.2 of interpupillary distance width IPD, and remaining image capture devices, such as second image capture device 332 and third four image capture device 333 may be positioned or evenly spaced therebetween first end IPD IPD.1 and second end IPD.2 of interpupillary distance width IPD. In one embodiment each image capture devices 331-334 or lens 318 may surrounded by beveled edge 314, encircled by ring 316, and/or covered by lens cover 320 with a lens thereunder lens 318.

Figure 3D:
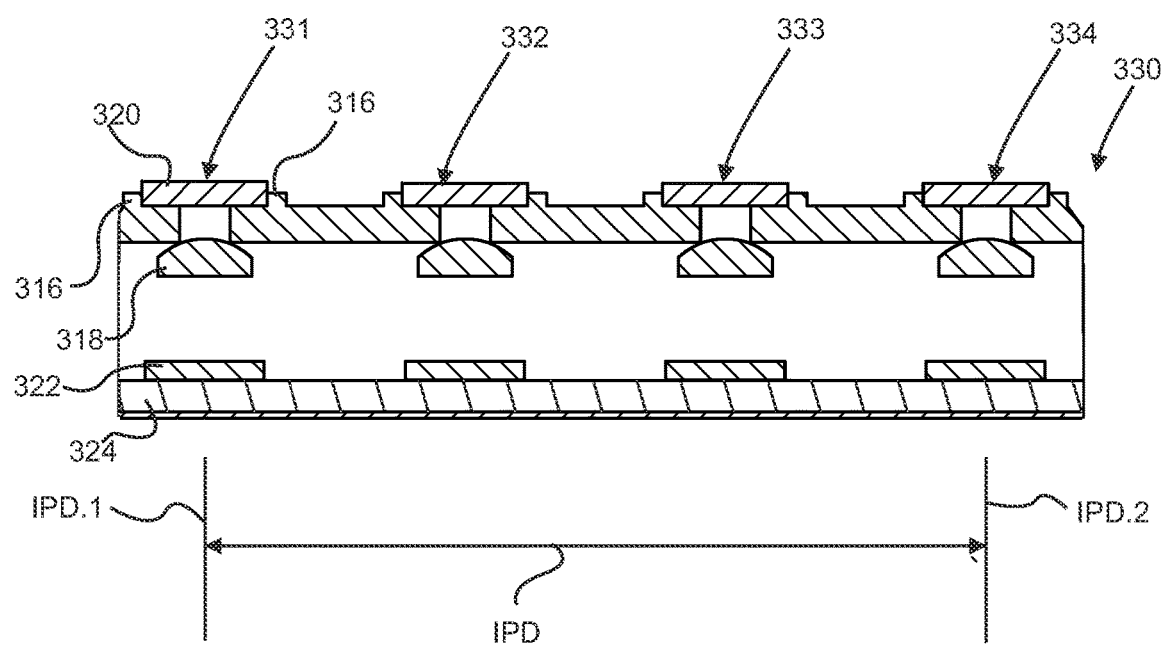
FIG. 3D is a cross-sectional diagram of an exemplary embodiment of the four image capture devices in series linearly of FIGS. 3A and 3B.

Referring now to FIG. 3D, by way of example, and not limitation, there is illustrated an cross-sectional diagram of an exemplary embodiment of image capture module 330, of FIG. 3C. Image capture module 330 may include digital or image capture devices 331-334 with four image capture devices in series linearly within an intraocular or interpupillary distance width IPD, the distance between an average human's pupil. Image capture devices 331-334 may include first image capture device 331, second image capture device 332, third image capture device 333, fourth image capture device 334. Each image capture devices 331-334 or lens 318 may be surrounded by beveled edge 314, encircled by ring 316, and/or covered by lens cover 320 with a lens thereunder lens 318. It is contemplated herein that image capture devices 331-334 may include optical module, such as lens 318 configured to focus an image of scene S on sensor module, such as image capture sensor 322 configured to generate image signals for the captured image of scene S, and data processing module 324 configured to generate image data for the captured image on the basis of the generated image signals from image capture sensor 322.

It is contemplated herein that other sensor components to generate image signals for the captured image of scene S and other data processing module 324 to process or manipulate the image data may be utilized herein.

It is contemplated herein that when sensor 340 is not utilized to calculate different depths in scene S (distance from or image capture devices 331-334 to foreground, background, and person P or object, such as closest point CP, key subject point KS, and furthest point FP) then a user may be prompted to capture the scene S images a set distance from image capture devices 331-334 to key subject point KS in a scene S, including but not limited to six feet (6 ft.) distance from closest point CP or key subject KS point.

Figure 3E:
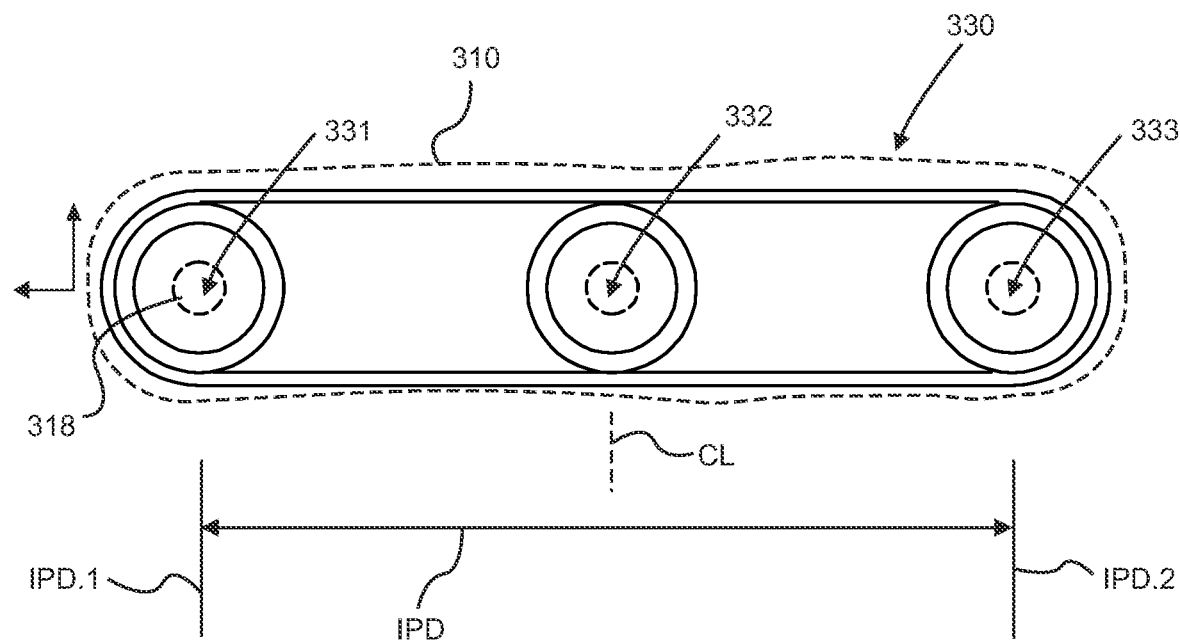
FIG. 3E is an exploded diagram of an exemplary embodiment of the three image capture devices in series linearly within an intraocular or interpupillary distance width, the distance between an average human's pupils.

Referring now to FIG. 3E, by way of example, and not limitation, there is illustrated an exploded diagram of an exemplary embodiment of image capture module 330. Image capture module 330 may include digital or image capture devices 331-333 with a plurality or three digital image capture devices in series linearly within an intraocular or interpupillary distance width IPD, the distance between an average human's pupil. Image capture devices 331-333 may include first image capture device 331, second image capture device 332, and third image capture device 333. First image capture device 331 may be centered proximate first end IPD IPD.1 of interpupillary distance width IPD, third image capture device 333 may be centered proximate second end IPD.2 of interpupillary distance width IPD, and remaining image capture devices, such as second image capture device 332 may be centered therebetween first end IPD IPD.1 and second end IPD.2 of interpupillary distance width IPDE. In one embodiment each image capture devices 331-334 or lens 318 may surrounded by beveled edge 314, encircled by ring 316, and/or covered by lens cover 320 with a lens thereunder lens 318.

Figure 3F:
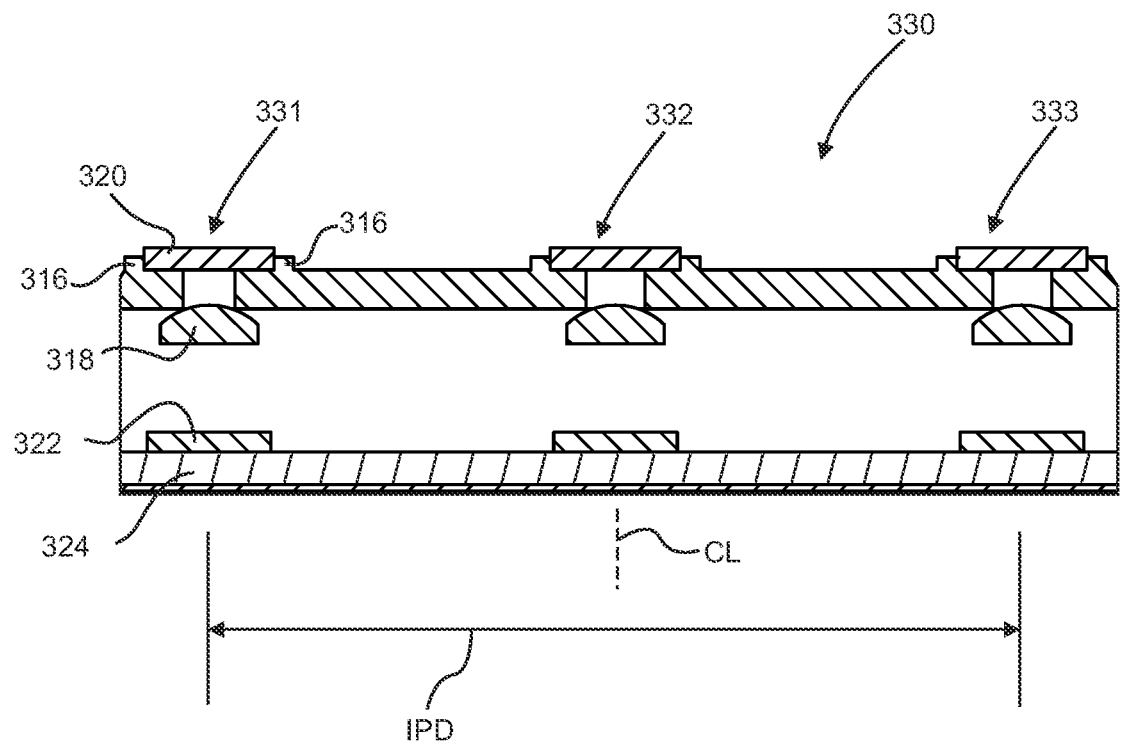
FIG. 3F is a cross-sectional diagram of an exemplary embodiment of the three image capture devices in series linearly of FIG. 3E.

Referring now to FIG. 3F, by way of example, and not limitation, there is illustrated an cross-sectional diagram of an exemplary embodiment of image capture module 330, of FIG. 3E. Image capture module 330 may include digital or image capture devices 331-333 with three image capture devices in series linearly within an intraocular or interpupillary distance width IPD, the distance between an average human's pupil. Image capture devices 331-333 may include first image capture device 331, second image capture device 332, and third image capture device 333. Each image capture devices 331-333 or lens 318 may be surrounded by beveled edge 314, encircled by ring 316, and/or covered by lens cover 320 with a lens thereunder lens 318. It is contemplated herein that image capture devices 331-333 may include optical module, such as lens 318 configured to focus an image of scene S on sensor module, such as image capture sensor 322 configured to generate image signals for the captured image of scene S, and data processing module 324 configured to generate image data for the captured image on the basis of the generated image signals from image capture sensor 322.

It is contemplated herein that other sensor components to generate image signals for the captured image of scene S and other data processing module 324 to process or manipulate the image data may be utilized herein.

Figure 3G:
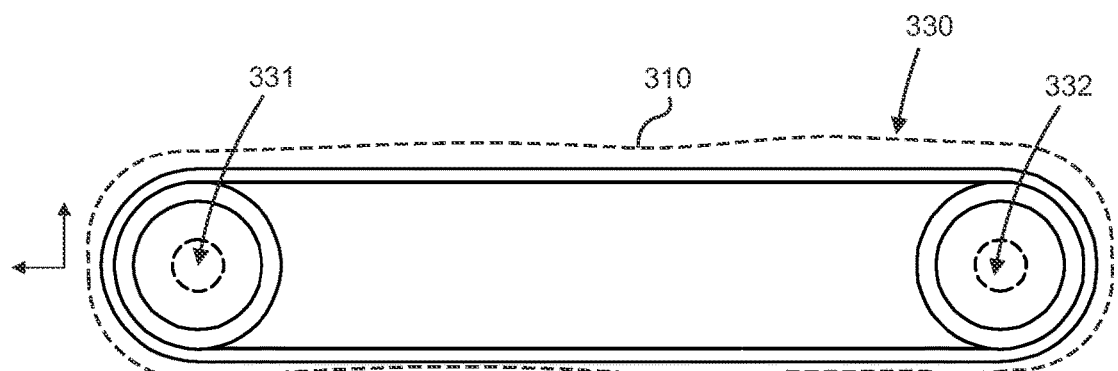
FIG. 3G is an exploded diagram of an exemplary embodiment of the two image capture devices in series linearly within an intraocular or interpupillary distance width, the distance between an average human's pupils.

Referring now to FIG. 3G, by way of example, and not limitation, there is illustrated an exploded diagram of an exemplary embodiment of image capture module 330. Image capture module 330 may include a plurality or two digital image capture devices 331-332 with two image capture devices in series linearly within an intraocular or interpupillary distance width IPD, the distance between an average human's pupil. Image capture devices 331-332 may include first image capture device 331 and second image capture device 332. First image capture device 331 may be centered proximate first end IPD IPD.1 of interpupillary distance width IPD and second image capture device 332 may be centered proximate second end IPD.2 of interpupillary distance width IPD. In one embodiment each image capture devices 331-332 or lens 318 may surrounded by beveled edge 314, encircled by ring 316, and/or covered by lens cover 320 with a lens thereunder lens 318.

Figure 3H:
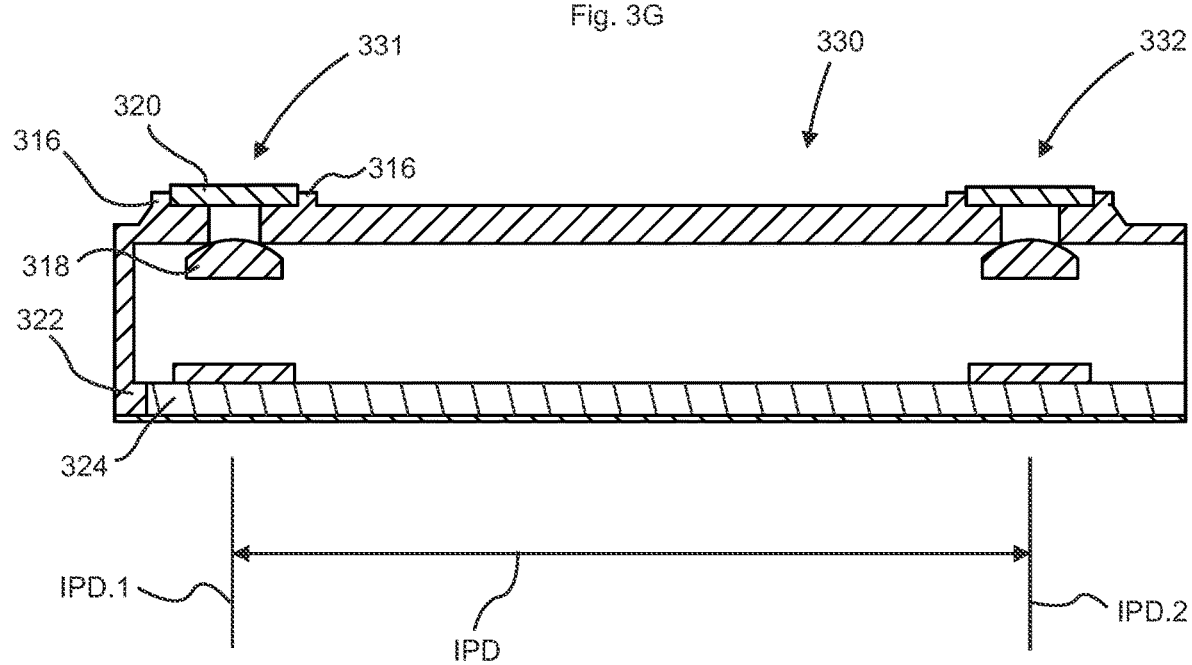
FIG. 3H is a cross-sectional diagram of an exemplary embodiment of the two image capture devices in series linearly of FIG. 3G.

Referring now to FIG. 3H, by way of example, and not limitation, there is illustrated an cross-sectional diagram of an exemplary embodiment of image capture module 330, of FIG. 3G. Image capture module 330 may include digital or image capture devices 331-332 with two image capture devices in series linearly within an intraocular or interpupillary distance width IPD, the distance between an average human's pupil. Image capture devices 331-332 may include first image capture device 331 and second image capture device 332. Each image capture devices 331-332 or lens 318 may be surrounded by beveled edge 314, encircled by ring 316, and/or covered by lens cover 320 with a lens thereunder lens 318. It is contemplated herein that image capture devices 331-332 may include optical module, such as lens 318 configured to focus an image of scene S on sensor module, such as image capture sensor 322 configured to generate image signals for the captured image of scene S, and data processing module 324 configured to generate image data for the captured image on the basis of the generated image signals from image capture sensor 322.

It is contemplated herein that other sensor components to generate image signals for the captured image of scene S and other data processing module 324 to process or manipulate the image data may be utilized herein.

It is contemplated herein that image capture module 330 and/or digital or image capture devices 331-334 are used to obtain the 2D digital views of FIGS. 13 and 14 and FIGS. 9-12 of scene S. Moreover, it is further contemplated herein that image capture module 330 may include a plurality of image capture devices other than the number set forth herein. Furthermore, it is further contemplated herein that image capture module 330 may include a plurality of image capture devices positioned within a linear distance approximately equal to interpupillary distance width IPD. Still furthermore, it is further contemplated herein that image capture module 330 may include a plurality of image capture devices positioned vertically (computer system 10 or other smart device or portable smart device having short edge 311), horizontally (computer system 10 or other smart device or portable smart device having long edge 312) or otherwise positioned spaced apart in series linearly.

It is further contemplated herein that image capture module 330 and digital or image capture devices 331-34 positioned linearly within the intraocular or interpupillary distance width IPD enables accurate scene S reproduction therein display 208 to produce a multidimensional digital image on display 208.

Referring now to FIG. 4, by way of example, and not limitation, there is illustrated a front facial view of a human with left eye LE and right eye RE and each having a midpoint of a pupil P1, P2 to illustrate the human eye spacing or the intraocular or interpupillary distance IPD width, the distance between an average human's visual system pupils. Interpupillary distance (IPD) is the distance measured in millimeters/inches between the centers of the pupils of the eyes. This measurement is different from person to person and also depends on whether they are looking at near objects or far away. P1 may be represented by first end IPD.1 of interpupillary distance width IPD and PS may be represented by second end IPD.2 of interpupillary distance width IPD.

Figure 5A:
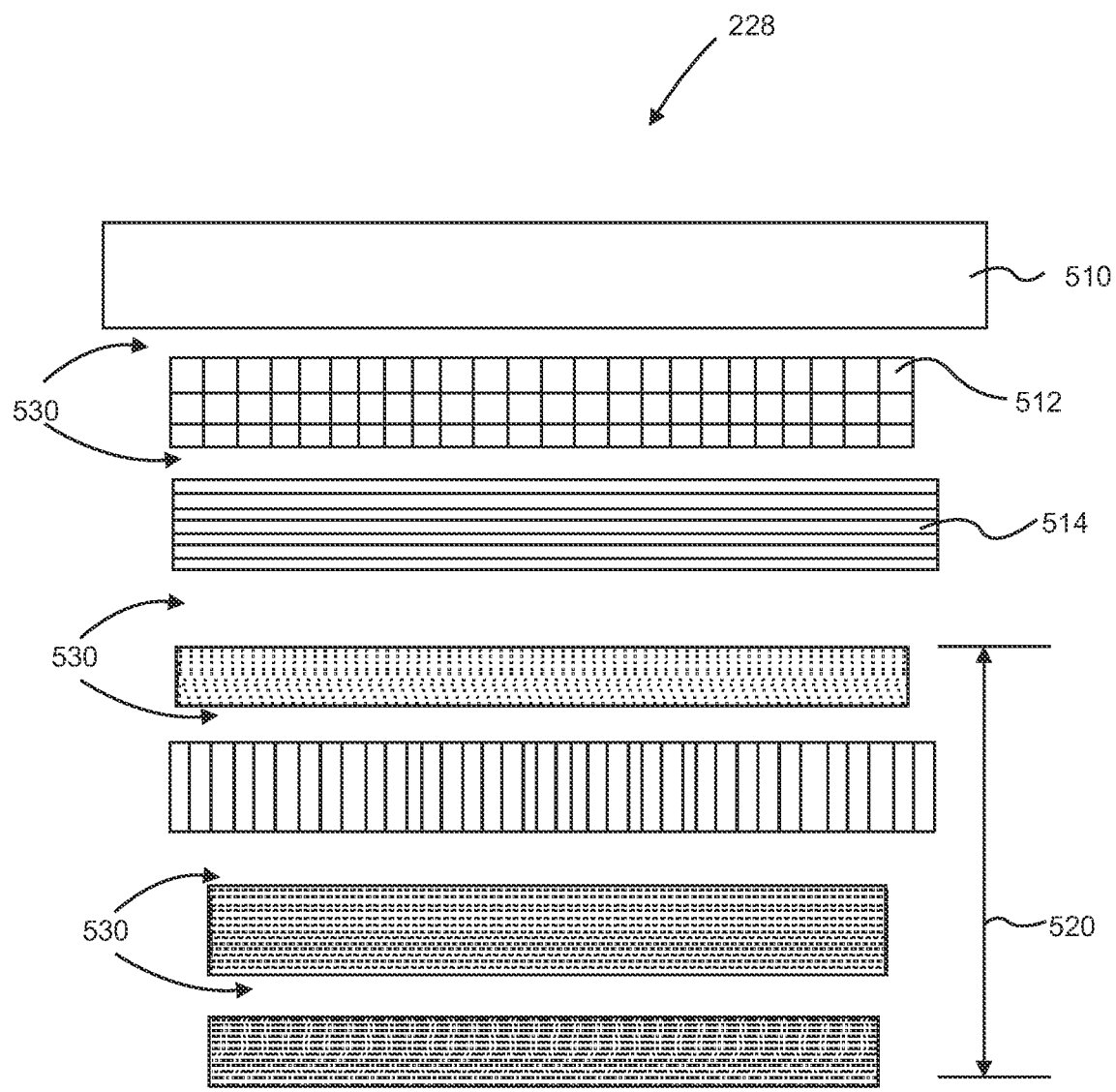
FIG. 5A is a cross-section diagram of an exemplary embodiment of a display stack according to select embodiments of the instant disclosure.

Referring now to FIG. 5A, there is illustrated by way of example, and not limitation a cross-sectional view of an exemplary stack up of components of display 208. Display 208 may include an array of or plurality of pixels emitting light, such as LCD panel stack of components 520 having electrodes, such as front electrodes and back electrodes, polarizers, such as horizontal polarizer and vertical polarizer, diffusers, such as gray diffuser, white diffuser, and backlight to emit red R, green G, and blue B light. Moreover, display 208 may include other standard LCD user U interaction components, such as top glass cover 510 with capacitive touch screen glass 512 positioned between top glass cover 510 and LCD panel stack components 520. It is contemplated herein that other forms of display 208 may be included herein other than LCD, such LED, ELED, PDP, QLED, and other types of display technologies. Furthermore, display 208 may include a lens array, such as lenticular lens 514 preferably positioned between capacitive touch screen glass 512 and LCD panel stack of components 520, and configured to bend or refract light in a manner capable of displaying an interlaced stereo pair of left and right images as a 3d or multidimensional digital image(s) 1010 on display 208 and, thereby displaying a multidimensional digital image of scene S on display 208. Transparent adhesives 530 may be utilized to bond elements in the stack, whether used as a horizontal adhesive or a vertical adhesive to hold multiple elements in the stack. For example, to produce a 3D view or produce a multidimensional digital image on display 208, a 1920×1200 pixel image via a plurality of pixels needs to be divided in half, 960×1200, and either half of the plurality of pixels may be utilized for a left image and right image.

It is contemplated herein that lens array may include other techniques to bend or refract light, such as barrier screen, lenticular, parabolic, overlays, waveguides, black line and the like capable of separate into a left and right image.

It is further contemplated herein that lenticular lens 514 may be orientated in vertical columns when display 208 is held in a landscape view to produce a multidimensional digital image on display 208. However, when display 208 is held in a portrait view the 3D effect is unnoticeable enabling 2D and 3D viewing with the same display 208.

It is still further contemplated herein that smoothing, or other image noise reduction techniques, and foreground subject focus may be used to soften and enhance the 3D view or multidimensional digital image on display 208.

Figure 5B:
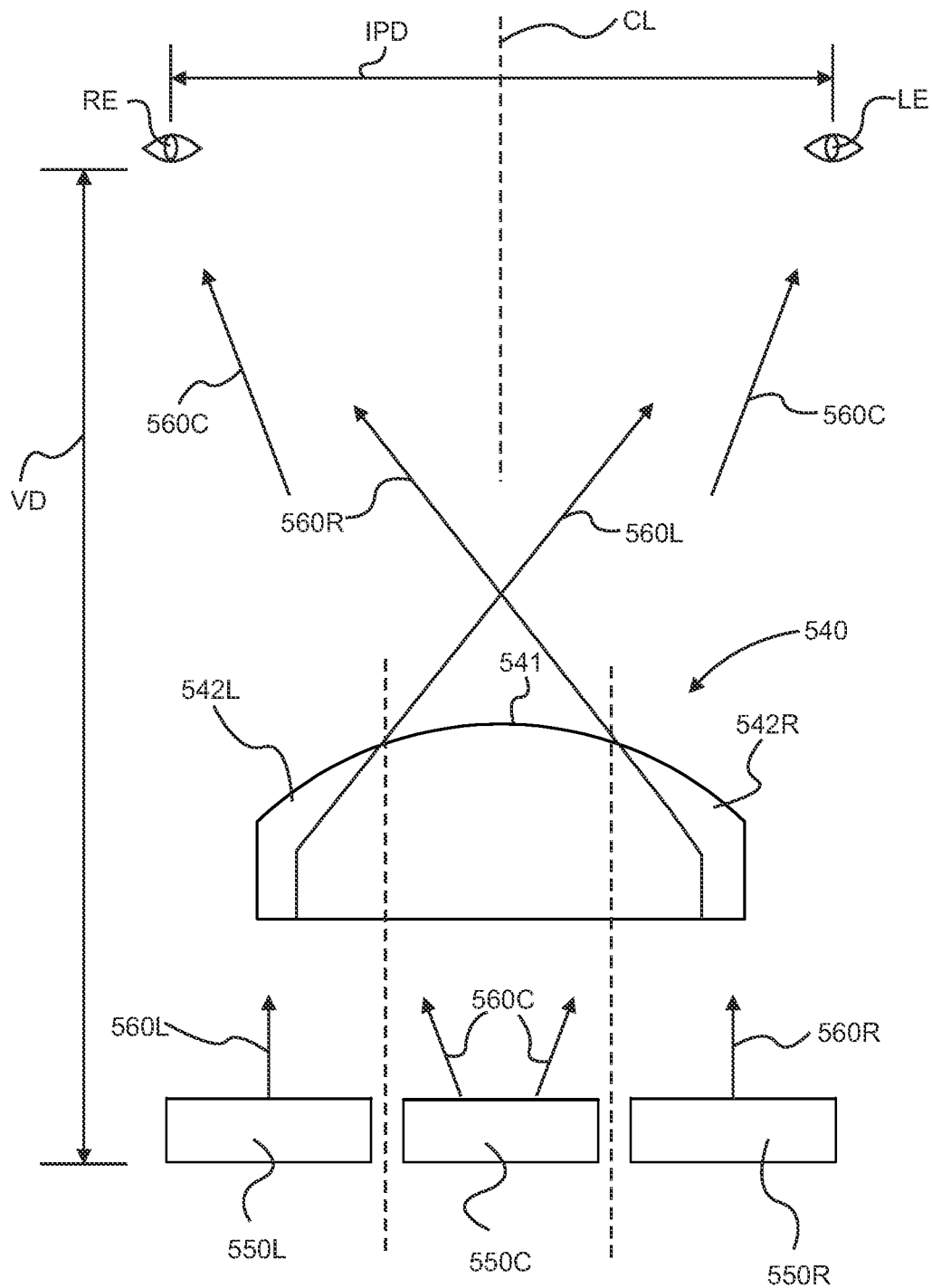

Referring now to FIG. 5B, there is illustrated by way of example, and not limitation a representative segment or section of one embodiment of exemplary refractive element, such as lenticular lens 514 of display 208. Each sub-element of lenticular lens 514 being arced or curved or arched segment or section 540 of lenticular lens 514 may be configured having a repeating series of trapezoidal lens segments or plurality of sub-elements or refractive elements. For example, each arced or curved or arched segment 540 may be configured having lens peak 541 of lenticular lens 540 and dimensioned to be one pixel 550 (emitting red R, green G, and blue B light) wide such as having assigned center pixel 550C thereto lens peak 541. It is contemplated herein that center pixel 550C light passes through lenticular lens 540 as center light 560C to provide 2D viewing of image on display 208 to left eye LE and right eye RE a viewing distance VD from pixel 550 or trapezoidal segment or section 540 of lenticular lens 514. Moreover, each arced or curved segment 540 may be configured having angled sections, such as lens angle A1 of lens refractive element, such as lens sub-element 542 (plurality of sub-elements) of lenticular lens 540 and dimensioned to be one pixel wide, such as having left pixel 550L and right pixel 550R assigned thereto left lens, left lens sub-element 542L having angle A1, and right lens sub-element 542R having angle A1, for example an incline angle and a decline angle respectively to refract light across center line CL. It is contemplated herein that pixel 550L/R light passes through lenticular lens 540 and bends or refracts to provide left and right images to enable 3D viewing of image on display 208; via left pixel 550L light passes through left lens angle 542L and bends or refracts, such as light entering left lens angle 542L bends or refracts to cross center line CL to the right R side, left image light 560L toward left eye LE and right pixel 550R light passes through right lens angle 542R and bends or refracts, such as light entering right lens angle 542R bends or refracts to cross center line CL to the left side L, right image light 560R toward right eye RE, to produce a multidimensional digital image on display 208.

Figure 6:
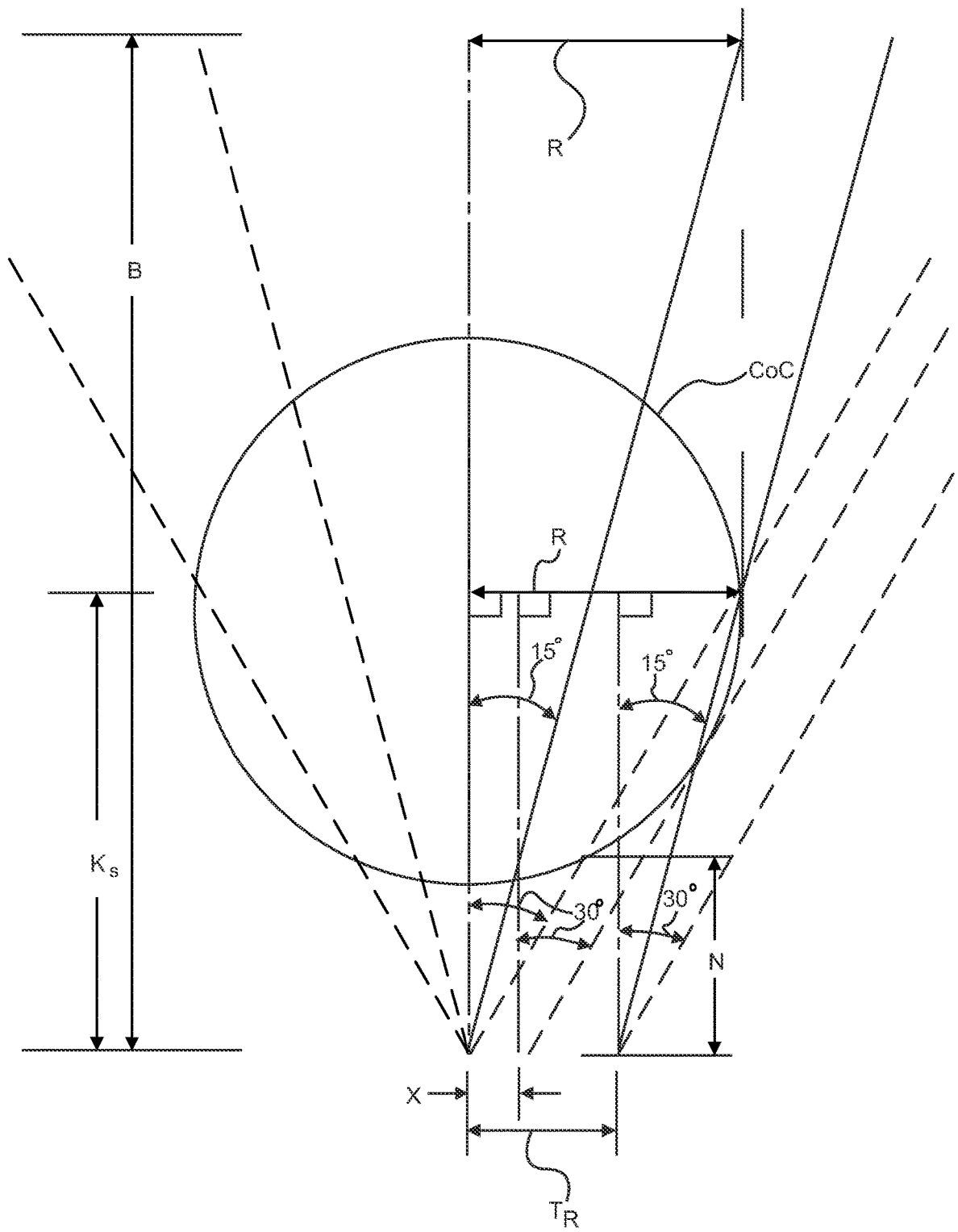
FIG. 6 is a top view illustration identifying planes of a scene and a circle of comfort in scale with right triangles defining positioning of capture devices on lens plane.

It is contemplated herein that left and right images may be produce as set forth in FIGS. 6.1-6.3 from U.S. Pat. Nos. 9,992,473, 10,033,990, and 10,178,247 and electrically communicated to left pixel 550L and right pixel 550R. Moreover, 2D image may be electrically communicated to center pixel 550C.

In this FIG. each lens peak 541 has a corresponding left and right angled lens 542, such as left angled lens 542L and right angled lens 542R on either side of lens peak 541 and each assigned one pixel, center pixel 550C, left pixel 550L and right pixel 550R, assigned respectively thereto.

In this FIG., the viewing angle A1 is a function of viewing distance VD, size S of display 208, wherein A1=2 arctan (S/2VD)

In one embodiment, each pixel may be configured from a set of sub-pixels. For example, to produce a multidimensional digital image on display 208 each pixel may be configured as one or two 3×3 sub-pixels of LCD panel stack components 520 emitting one or two red R light, one or two green G light, and one or two blue B light therethrough segments or sections of lenticular lens 540 to produce a multidimensional digital image on display 208. Red R light, green G light, and blue B may be configured as vertical stacks of three horizontal sub-pixels.

It is recognized herein that trapezoid shaped lens 540 bends or refracts light uniformly through its center C, left L side, and right R side, such as left angled lens 542L and right angled lens 542R, and lens peak 541.

Figure 5C:
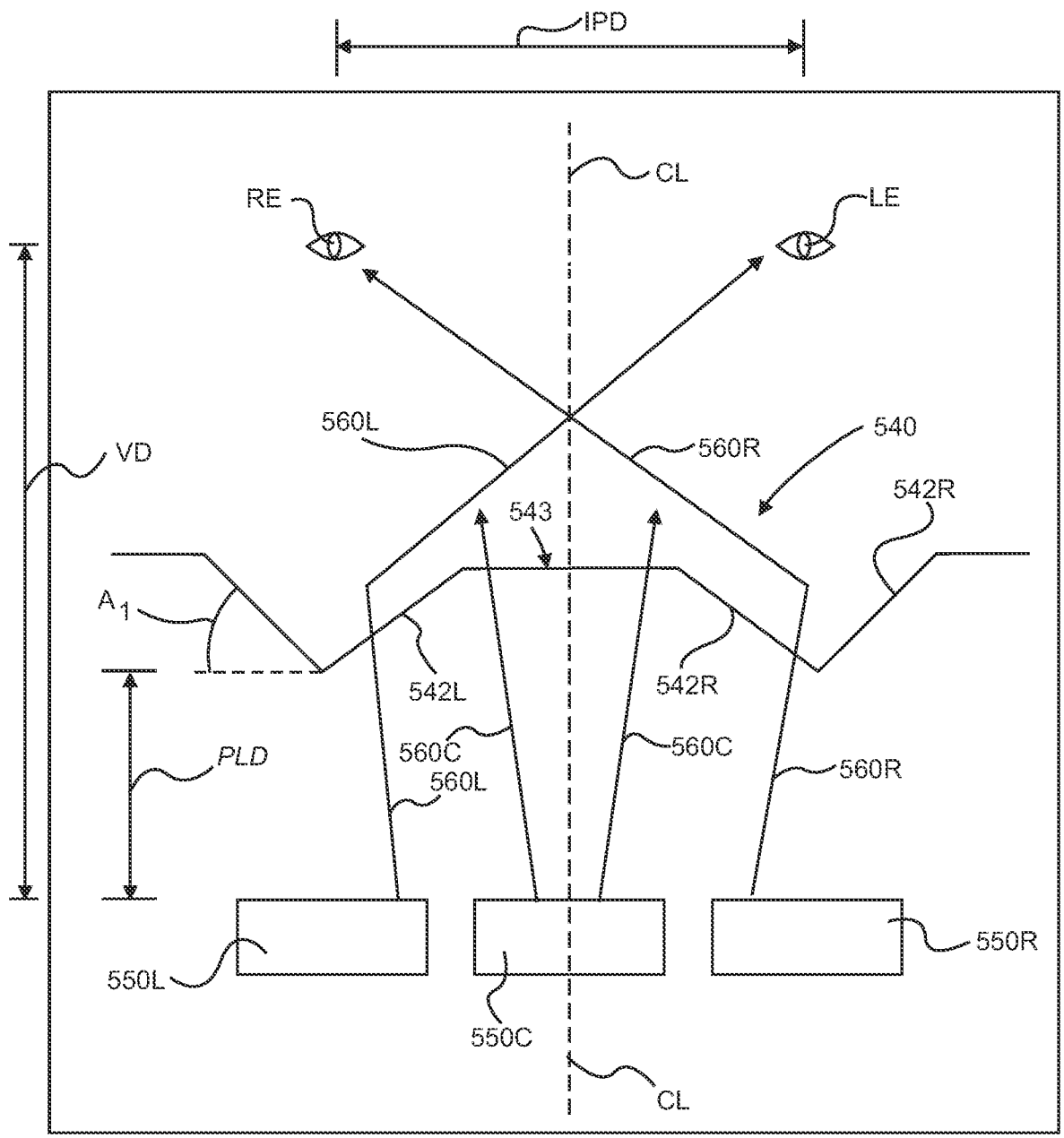

Referring now to FIG. 5C, there is illustrated by way of example, and not limitation a prototype segment or section of one embodiment of exemplary lenticular lens 514 of display 208. Each segment or plurality of sub-elements or refractive elements being trapezoidal shaped segment or section 540 of lenticular lens 514 may be configured having a repeating series of trapezoidal lens segments. For example, each trapezoidal segment 540 may be configured having lens peak 541 of lenticular lens 540 and dimensioned to be one or two pixel 550 wide and flat or straight lens, such as lens valley 543 and dimensioned to be one or two pixel 550 wide (emitting red R, green G, and blue B light). For example, lens valley 543 may be assigned center pixel 550C. It is contemplated herein that center pixel 550C light passes through lenticular lens 540 as center light 560C to provide 2D viewing of image on display 208 to left eye LE and right eye RE a viewing distance VD from pixel 550 or trapezoidal segment or section 540 of lenticular lens 514. Moreover, each trapezoidal segment 540 may be configured having angled sections, such as lens angle 542 of lenticular lens 540 and dimensioned to be one or two pixel wide, such as having left pixel 550L and right pixel 550R assigned thereto left lens angle 542L and right lens angle 542R, respectively. It is contemplated herein that pixel 550L/R light passes through lenticular lens 540 and bends to provide left and right images to enable 3D viewing of image on display 208; via left pixel 550L light passes through left lens angle 542L and bends or refracts, such as light entering left lens angle 542L bends or refracts to cross center line CL to the right R side, left image light 560L toward left eye LE; and right pixel 550R light passes through right lens angle 542R and bends or refracts, such as light entering right lens angle 542R bends or refracts to cross center line CL to the left side L, right image light 560R toward right eye RE to produce a multidimensional digital image on display 208.

It is contemplated herein that angle A1 of lens angle 542 is a function of the pixel 550 size, stack up of components of display 208, refractive properties of lenticular lens 514, and distance left eye LE and right eye RE are from pixel 550, viewing distance VD.

In this FIG., the viewing angle A1 is a function of viewing distance VD, size S of display 208, wherein A1=2 arctan (S/2VD).

Figure 5D:
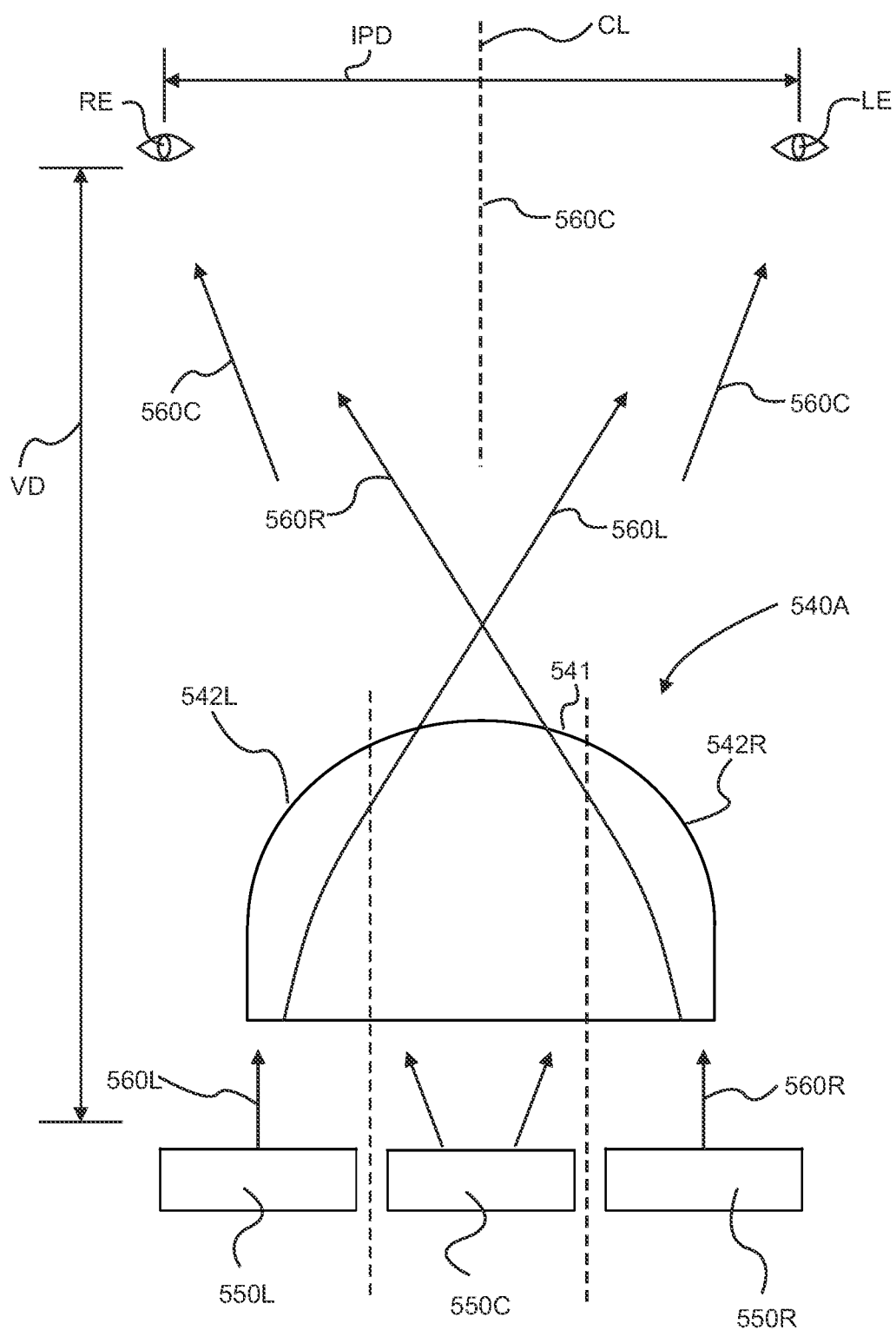

Referring now to FIG. 5D, there is illustrated by way of example, and not limitation a representative segment or section of one embodiment of exemplary lenticular lens 514 of display 208. Each segment or plurality of sub-elements or refractive elements being parabolic or dome shaped segment or section 540A (parabolic lens or dome lens) of lenticular lens 514 may be configured having a repeating series of dome shaped, curved, semi-circular lens segments. For example, each dome segment 540A may be configured having lens peak 541 of lenticular lens 540 and dimensioned to be one or two pixel 550 wide (emitting red R, green G, and blue B light) such as having assigned center pixel 550C thereto lens peak 541. It is contemplated herein that center pixel 550C light passes through lenticular lens 540 as center light 560C to provide 2D viewing of image on display 208 to left eye LE and right eye RE a viewing distance VD from pixel 550 or trapezoidal segment or section 540 of lenticular lens 514. Moreover, each trapezoidal segment 540 may be configured having angled sections, such as lens angle 542 of lenticular lens 540 and dimensioned to be one pixel wide, such as having left pixel 550L and right pixel 550R assigned thereto left lens angle 542L and right lens angle 542R, respectively. It is contemplated herein that pixel 550L/R light passes through lenticular lens 540 and bends to provide left and right images to enable 3D viewing of image on display 208; via left pixel 550L light passes through left lens angle 542L and bends or refracts, such as light entering left lens angle 542L bends or refracts to cross center line CL to the right R side, left image light 560L toward left eye LE and right pixel 550R light passes through right lens angle 542R and bends or refracts, such as light entering right lens angle 542R bends or refracts to cross center line CL to the left side L, right image light 560R toward right eye RE to produce a multidimensional digital image on display 208.

It is recognized herein that dome shaped lens 4214B bends or refracts light almost uniformly through its center C, left L side, and right R side.

It is recognized herein that representative segment or section of one embodiment of exemplary lenticular lens 514 may be configured in a variety of other shapes and dimensions.

Moreover, to achieve highest quality two dimensional (2D) image viewing and multidimensional digital image viewing on the same display 208 simultaneously, a digital form of alternating black line or parallax barrier (alternating) may be utilized during multidimensional digital image viewing on display 208 without the addition of lenticular lens 514 to the stackup of display 208 and then digital form of digital form of alternating black line or parallax barrier (alternating) may be disabled during two dimensional (2D) image viewing on display 208.

A parallax barrier is a device placed in front of an image source, such as a liquid crystal display, to allow it to show a stereoscopic or multiscopic image without the need for the viewer to wear 3D glasses. Placed in front of the normal LCD, it consists of an opaque layer with a series of precisely spaced slits, allowing each eye to see a different set of pixels, so creating a sense of depth through parallax. A digital parallax barrier is a series of alternating black lines in front of an image source, such as a liquid crystal display (pixels), to allow it to show a stereoscopic or multiscopic image. In addition, face-tracking software functionality may be utilized to adjust the relative positions of the pixels and barrier slits according to the location of the user's eyes, allowing the user to experience the 3D from a wide range of positions. The book Design and Implementation of Autostereoscopic Displays by Kechoon Hong, Soon-gi Park, Jisoo Hong, Byoungho Lee incorporated herein by reference.

It is contemplated herein that parallax and key subject KS reference point calculations may be formulated for the digital or image capture devices 331-334 (n devices) spacing, display 208 distance from user U, lenticular lens 514 configuration (lens angle A1, 542, lens per millimeter and millimeter depth of the array), lens angle 542 as a function of the stack up of components of display 208, refractive properties of lenticular lens 514, and distance left eye LE and right eye RE are from pixel 550, viewing distance VD, distance between capture devices image capture devices 331-332, image capture devices 331-333, or image capture devices 331-334 (interpupillary distance IPD), see FIG. 6 below, and the like to produce digital multi-dimensional images as related to the viewing devices or other viewing functionality, such as barrier screen, lenticular, parabolic, overlays, waveguides, black line and the like with an integrated LCD layer in an LED or OLED, LCD, OLED, and combinations thereof or other viewing devices.

Incorporated herein by reference is paper entitled Three-Dimensional Display Technology, pages 1-80, by Jason Geng of other display techniques that may be utilized to produce display 208, incorporated herein by reference.

It is contemplated herein that number of lenses per mm or inch of lenticular lens 514 is determined by the pixels per inch of display 208.

It is contemplated herein that other angles A1 are contemplated herein, distance of pixels 550C, 550L, 550R from of lens 540 (approximately 0.5 mm), and user U viewing distance from smart device display 208 from user's eyes (approximately fifteen (15) inches), and average human interpupillary spacing between eyes (approximately 2.5 inches) may be factored or calculated to produce digital multi-dimensional images. Governing rules of angles and spacing assure the viewed images thereon display 208 is within the comfort zone of the viewing device to produce digital multi-dimensional images, see FIGS. 5, 6, 11 below.

It is recognized herein that angle A1 of lens 541 may be calculated and set based on viewing distance VD between user U eyes, left eye LE and right eye RE, and pixels 550, such as pixels 550C, 550L, 550R, a comfortable distance to hold display 208 from user's U eyes, such as ten (10) inches to arm/wrist length, or more preferably between approximately fifteen (15) inches to twenty-four (24) inches, and most preferably at approximately fifteen (15) inches.

In use, the user U moves the display 208 toward and away from user's eyes until the digital multi-dimensional images appear to user, this movement factor in user's U actual interpupillary distance IPD spacing and to match user's visual system (near sited and far sited discrepancies) as a function of width position of interlaced left and right images from two image capture devices 331-332, image capture devices 331-333, or image capture devices 331-334 (interpupillary distance IPD), distance between image capture devices, key subject KS depth therein each of digital images (n) of scene S (key subject KS algorithm), horizontal image translation algorithm of two images (left and right image) about key subject KS, interphasing algorithm of two images (left and right image) about key subject KS, angles A1, distance of pixels 550 from of lens 540 (pixel-lens distance (PLD) approximately 0.5 mm)) and refractive properties of lens array, such as trapezoid shaped lens 540 all factored in to produce digital multi-dimensional images for user U viewing display 208. First known elements are number of pixels 550 and number of images two image capture devices 331-332, image capture devices 331-333, or image capture devices 331-334 (interpupillary distance IPD). Images captured at or near interpupillary distance IPD matches the human visual system, simplifies the math, minimizes cross talk between the two images, fuzziness, image movement to produce digital multi-dimensional image viewable on display 208.

It is further contemplated herein that trapezoid shaped lens 540 may be formed from polystyrene, polycarbonate or other transparent materials or similar materials, as these material offers a variety of forms and shapes, may be manufactured into different shapes and sizes, and provide strength with reduced weight; however, other suitable materials or the like, can be utilized, provided such material has transparency and is machinable or formable as would meet the purpose described herein to produce a left and right stereo image and specified index of refraction. It is further contemplated herein that trapezoid shaped lens 541 may be configured with 4.5 lenticular lens per millimeter and approximately 0.33 mm depth.

Referring now to FIG. 6, there is illustrated by way of example, and not limitation a representative illustration of Circle of Comfort CoC in scale with FIGS. 4.1 and 3.1. For the defined plane, the image captured on the lens plane will be comfortable and compatible with human visual system of user U viewing the final image displayed on display 208 if a substantial portion of the image(s) is captured within the Circle of Comfort CoC. Any object, such as near plane N, key subject KS plane, and far plane B captured by two image capture devices, such as image capture devices 331-332, image capture devices 331-333, or image capture devices 331-334 (interpupillary distance IPD) within the Circle of Comfort CoC will be in focus to the viewer when reproduced as interlaced left and right images, such as two image from capture devices capture devices image capture devices 331-332, image capture devices 331-333, or image capture devices 331-334 (interpupillary distance IPD) on display 208. The back-object plane or far plane B is defined as the distance to the intersection of the 15 degree radial line to the perpendicular in the field of view to the 30 degree line or R the radius of the Circle of Comfort CoC. Moreover, defining the Circle of Comfort CoC as the circle formed by passing the diameter of the circle along the perpendicular to Key Subject KS plane with a width determined by the 30 degree radials from the center point on the lens plane, image capture module 330.

Linear positioning or spacing of two image capture devices, such as image capture devices 331-332, image capture devices 331-333, or image capture devices 331-334 (interpupillary distance IPD) on lens plane within the 30 degree line just tangent to the Circle of Comfort CoC may be utilized to create motion parallax between the two images when viewing an interlaced left and right image, such as two image capture devices 331-332, image capture devices 331-333, or image capture devices 331-334 (interpupillary distance IPD) on display 208 will be comfortable and compatible with human visual system of user U viewing the final image displayed on display 208.

Referring now to FIG. 6A, 6B, 6C, and 9, there is illustrated by way of example, and not limitation right triangles derived from FIG. 6. All the definitions are based on holding right triangles within the relationship of the scene to image capture. Thus, knowing the key subject KS distance (convergence point) we can calculate the following parameters.

FIG. 6A to calculate the radius R of Comfort CoC.

R/KS=tan 30 degree

R=KS*tan 30 degree

FIG. 6B to calculate the optimum distance between image capture devices 331-332, image capture devices 331-333, or image capture devices 331-334 (interpupillary distance IPD).

TR/KS=tan 15 degree

TR=KS*tan 15 degree; and IPD is 2*TR

FIG. 6C calculate the optimum far plane

Tan 15 degree=R/B

B=(KS*tan 30 degree)/tan 15 degree

Ratio of near plane to far plane=((KS/(KS 8 tan 30 degree))*tan 15 degree

In order to understand the meaning of TR, point on the linear image capture line of the lends plane that the 15 degree line hits/touches the Comfort CoC. The images are arranged so the key subject KS point is the same in all images captured via two image from capture devices capture devices image capture devices 331-332, image capture devices 331-333, or image capture devices 331-334 (interpupillary distance IPD). See FIGS. 6.1-6.3 of U.S. Pat. No. 10,033,990.

A user of image capture devices composes the scene S and moves the image capture devices 330 in our case so the circle of confusion conveys the scene S. Since image capture devices 330 are using multi cameras linearly spaced there is a binocular disparity between the two images captured by linear offset of the image capture devices 330. This disparity can be change by changing image capture devices 330 settings or moving the key subject KS back or away from image capture devices to lessen the disparity or moving the key subject KS closer to image capture devices to increase the disparity. Our system is a fixed image capture devices system and as a guideline, experimentally developed, the near plane should be no closer than approximately six feet from image capture devices 330.

Figure 7:
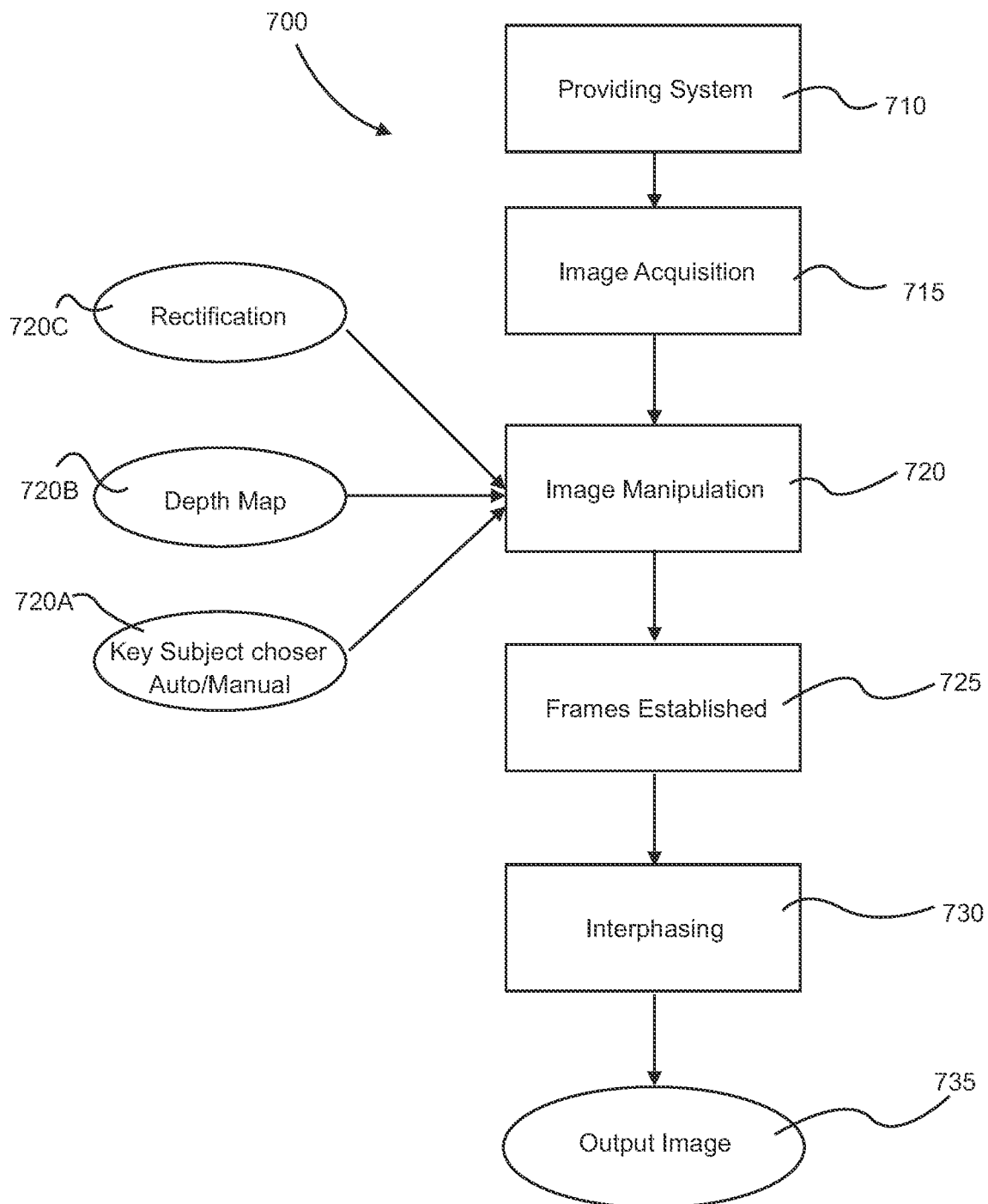
FIG. 7 is an exemplary embodiment of a flow diagram of a method of generating a multidimensional image(s) from the 2D digital images shown in FIG. 8A captured utilizing capture devices shown in FIGS. 3.

Referring now to FIG. 7, there is illustrated process steps as a flow diagram 700 of a method of acquiring and converting the acquired stereoscopic images into a 3-D image as performed by a computer system 10, and viewable on display 208. In block or step 710, providing computer system 10 having image capture devices 330 and configured display 208, as described above in FIGS. 1-6, to enable capture of 2-dimensional stereo images with a disparity approximately intraocular or interpupillary distance width IPD, the distance between an average human's pupil, and displaying 3-dimensional viewable image.

Figure 8A:
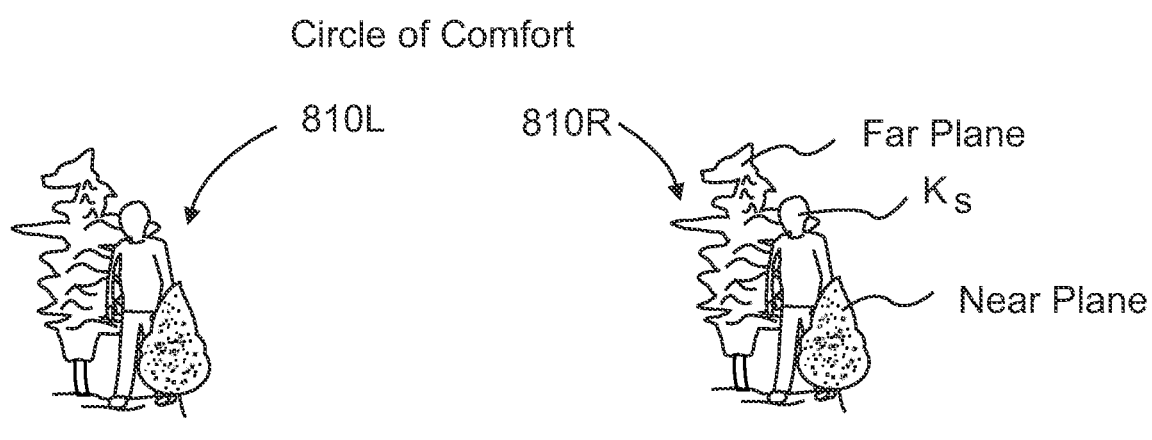
FIG. 8A is a top view illustration of an exemplary embodiment of two images of a scene captured utilizing capture devices shown in FIGS. 3.
Figure 8B:
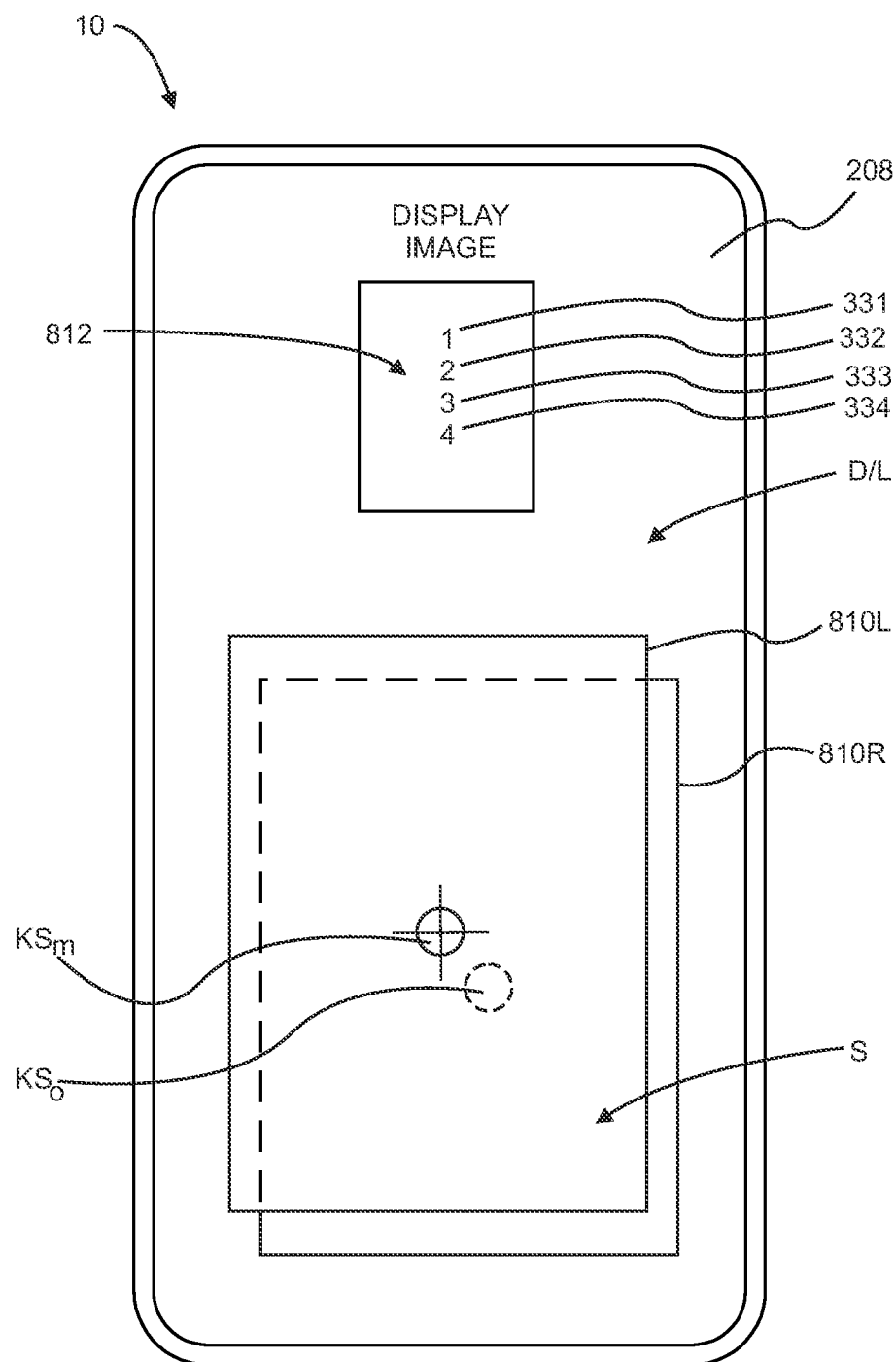
FIG. 8B is a top view illustration of an exemplary embodiment of a display of computer system running an application.
Figure 9:
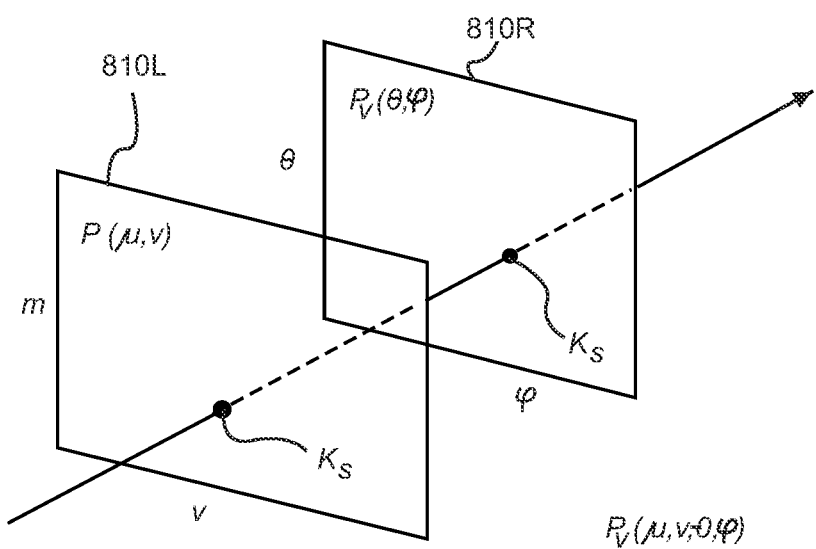
FIG. 9 is a diagram illustration of an exemplary embodiment of a geometrical shift of a point between two images (frames), such as in FIG. 8A according to select embodiments of the instant disclosure.

In block or step 715, computer system 10 via image capture application 206 (method of capture) is configured to capture two digital images of scene S via image capture module 330 having at least two image capture devices 331 and 332, 333, or 334 positioned in series linearly within an intraocular or interpupillary distance width IPD (distance between pupils of human visual system within a Circle of Comfort relationship to optimize digital multi-dimensional images for the human visual system) capture a plurality of 2D digital source images. Two image capture devices 331 and 332, 333, or 334 capture plurality of digital images of scene S as left image 810L and right image 810R of scene S, shown in FIG. 8A (plurality of digital images). Alternatively, computer system 10 via image manipulation application and display 208 may be configured to enable user U to select or identify two image capture devices of image capture devices 331 (1), 332 (2), 333 (3), or 334 (4) to capture two digital images of scene S as left image 810L and right image 810R of scene S. User U may tap or other identification interaction with selection box 812 to select or identify key subject KS in the source images, left image 810L and right image 810R of scene S, as shown in FIG. 8B.

It is recognized herein that user U may be instructed on best practices for capturing images(n) of scene S via computer system 10 via image capture application 206 and display 208, such as frame the scene S to include the key subject KS in scene S, selection of the prominent foreground feature of scene S, and furthest point FP in scene S, may include two or more of the key subject(s) KS in scene S, selection of closest point CP in scene S, the prominent background feature of scene S and the like. Moreover, position key subject(s) KS in scene S a specified distance from image capture devices 331-334 (n devices). Furthermore, position closest point CP in scene S a specified distance from image capture devices 331-334 (n devices).

Alternatively, in block or step 715, user U may utilize computer system 10, display 208, and application program(s) 206 to input, source, receive, or download pairs of images to computer system 10, such as via AirDrop.

It is recognized herein that step 715, computer system 10 via image capture application 206, image manipulation application 206, image display application 206 may be performed utilizing distinct and separately located computer systems 10, such as one or more user systems 220 first smart device, 222 second smart device, 224 third smart device (smart devices) and application program(s) 206. For example, using a camera system remote from image manipulation system, and remote from image viewing system, step 715 may be performed proximate scene S via computer system 10 (first processor) and application program(s) 206 communicating between user systems 220, 222, 224 and application program(s) 206. Here, camera system may be positioned or stationed to capture segments of different viewpoints of an event or entertainment, such as scene S. Next, via communications link 240 and/or network 250, or 5G computer systems 10 and application program(s) 206 via more user systems 220, 222, 224 may capture and transmit a plurality of two digital images of scene S as left image 810L and right image 810R of scene S sets of images(n) of scene S from capture devices 1631-1634 (n devices) relative to key subject KS point.

As an example, a basket, batter's box, goal, position player, concert singer, lead instrument, or other entertainment or event space, or personnel as scene S, may be configured with a plurality capture devices 331-334 (n devices) of scene S from specific advantage points. This computer system 10 via image capture application 206 may be utilized to analyze events to determine correct outcome, such as instant replay or video assistance referee (VAR). This computer system 10 via image capture application 206 may be utilized to capture multiple two digital images of scene S as left image 810L and right image 810R of scene S. This computer system 10 via image capture application 206 may be utilized to capture multiple two digital images of scene S as left image 810L and right image 810R of entertainment or event space, as scene S.

An additional example, a vehicle vantage or view point of scene S about the vehicle, wherein a vehicle may be configured with a plurality capture devices 331-334 (n devices) of scene S from specific advantage points of the vehicle. This computer system 10 (first processor) via image capture application 206 and plurality capture devices 331-334 (n devices) may be utilized to capture multiple two digital images of scene S as left image 810L and right image 810R of scene S (plurality of digital images) from different positions around vehicle, especially an auto piloted vehicle, autonomous driving, agriculture, warehouse, transportation, ship, craft, drone, and the like.

Images captured at or near interpupillary distance IPD matches the human visual system, which simplifies the math, minimizes cross talk between the two images, reduces fuzziness and image movement to produce digital multi-dimensional image viewable on display 208.

Additionally, in block or step 715, utilizing computer system 10, display 208, and application program(s) 206 (via image capture application) settings to align(ing) or position (ing) an icon, such as cross hair 814, of FIG. 8B, on key subject KS of a scene S displayed thereon display 208, for example by touching or dragging image of scene S or pointing computer system 10 in a different direction to align cross hair 814, of FIG. 8B, on key subject KS of a scene S. In block or step 715, obtaining or capturing images(n) of scene S from image capture devices 331-334 (n devices) focused on selected depths in an image or scene (depth) of scene S.

Additionally, in block or step 715, integrating I/O devices 202 with computer system 10, I/O devices 202 may include one or more sensors 340 in communication with computer system 10 to measure distance between computer system 10 and selected depths in scene S (depth) such as Key Subject KS and set the focal point of one or more image capture devices 331-334. It is contemplated herein that computer system 10, display 208, and application program(s) 206, may operate in auto mode wherein one or more sensors 340 may measure the distance between computer system 10 and selected depths in scene S (depth) such as Key Subject KS and set parameters of more image capture devices 331-334. Alternatively, in manual mode, a user may determine the correct distance between computer system 10 and selected depths in scene S (depth) such as Key Subject KS. Or computer system 10, display 208 may utilize one or more sensors 340 to measure distance between computer system 10 and selected depths in scene S (depth) such as Key Subject KS and provide on screen instructions or message (distance preference) to instruct user U to move closer or father away from Key Subject KS to optimize one or more image capture devices 331-334.

In block or step 720, computer system 10 via image manipulation application 206 is configured to receive left image 810L and a right image 810R of scene S captured by two image capture devices 331 and 332, 333, or 334 through an image acquisition application. The image acquisition application converts each stereographic image to a digital source image, such as a JPEG, GIF, TIF format. Ideally, each digital source image includes a number of visible objects, subjects or points therein, such as foreground or closest point associated with a near plane, background or furthest point associated with a far plane, and a key subject KS. The foreground and background point are the closest point and furthest point from the viewer (two image capture devices 331 and 332, 333, or 334), respectively. The depth of field is the depth or distance created within the object field (depicted distance between foreground to background). The principal axis is the line perpendicular to the scene passing through the key subject KS point, while the parallax is the displacement of the key subject KS point from the principal axis. In digital composition the displacement is always maintained as a whole integer number of pixels from the principal axis.

It is recognized herein that step 720, computer system 10 via image capture application 206, image manipulation application 206, image display application 206 may be performed utilizing distinct and separately located computer systems 10, such as one or more user systems 220, 222, 224 and application program(s) 206. For example, using an image manipulation system remote from image capture system, and remote from image viewing system, step 720 may be performed remote from scene S via a computer system 10 (third processor) and application program(s) 206 communicating between user systems 220, 222, 224 and application program(s) 206. Next, via communications link 240 and/or network 250, or 5G computer systems 10 (third processor) and application program(s) 206 via more user systems 220, 222, 224 may receive sets of images(n) of scene S from capture devices 1631-1634 (n devices) relative to key subject KS point and transmit a manipulated plurality of two digital images of scene S as left image 810L and right image 810R of scene S as digital multi-dimensional images 1010 to computer system 10 (first processor) and application program(s) 206.

In block or step 720A, computer system 10 via key subject application 206 is configured to identify a key subject KS in each source image, left image 810L and right image 810R of scene S. Key subject KS identified in each left image 810L and right image 810R corresponds to the same key subject 4KS of scene S. Moreover, in an auto mode computer system 10 via image manipulation application may identify the key subject KS based on a depth map 720B of the source images, left image 810L and right image 810R of scene S and performs a horizontal image translation to align stacked left image 810L and right image 810R of scene S about Key subject KS. Similarly, computer system 10 via image manipulation application may identify a foreground, closest point and background, furthest point using a depth map of the source images, left image 810L and right image 810R of scene S. Alternatively in manual mode, computer system 10 via image manipulation application and display 208 may be configured to enable user U may to select or identify key subject KS in the source images, left image 810L and right image 810R of scene S and computer system 10 via image manipulation application performs a horizontal image translation to align stacked left image 810L and right image 810R of scene S about Key subject KS. User U may tap, move a cursor or box or other identification to select or identify key subject KS in the source images, left image 810L and right image 810R of scene S, as shown in FIG. 8B.

Source images, left image 810L and right image 810R of scene S are all obtained with two image capture devices 331 and 332, 333, or 334 with the same focal length. Computer system 10 via key subject application 206 creates a point of certainty, key subject KS point by performing a horizontal image shift of source images, left image 810L and right image 810R of scene S, whereby Source images, left image 810L and right image 810R of scene S overlap at this one point. This image shift does two things, first it sets the depth of the image. All points in front of key subject KS point are closer to the observer and all points behind key subject KS point are further from the observer.

Moreover, in block or step 720A, utilizing computer system 10 via key subject application 206 to identify (ing) at least in part a pixel, set of pixels (finger point selection on display 208) in one or more images(n) of scene S from capture devices 331-334 (n devices) as key subject KS, respectively and align images horizontally about key subject KS; (horizontal image translation (HIT) stereo pair images (see codeproject.com as example) relative to lenticular lens 540) overlapping therein each images(n) of scene S from capture devices 331-334 (n devices) with a distance KS within a Circle of Comfort relationship to optimize digital multi-dimensional images 1010 for the human visual system.

It is contemplated herein that a computer system 10, display 208, and application program(s) 206 may perform an algorithm or set of steps to automatically identify and align key subject KS therein at least two images(n) of scene S from capture devices 331-334 (n devices). In block or step 720A, utilizing computer system 10, (in manual mode), display 208, and application program(s) 206 settings to at least in part enable a user U to align(ing) or edit alignment of a pixel, set of pixels (finger point selection), key subject KS point of at least two images(n) of scene S from capture devices 331-334 (n devices). Moreover, computer system 10 and application program(s) 206 may enable user U to perform frame enhancement, layer enrichment, feathering (smooth) the images (n) together, or other software techniques for producing 3D effects to display. It is contemplated herein that a computer system 10 (auto mode), display 208, and application program(s) 206 may perform an algorithm or set of steps to automatically perform align(ing) or edit alignment of a pixel, set of pixels of key subject KS point of at least two images(n) of scene S from capture devices 331-334 (n devices).

Calculate the minimum parallax and maximum parallax as a function of number of pixel, pixel density and number of frames, and closest and furthest points, and other parameters as set U.S. Pat. Nos. 9,992,473, 10,033,990, and 10,178,247, incorporated herein by reference in their entirety.

It is recognized herein that two images of scene S from two capture devices 331-334 (n devices) introduces a (left and right) binocular disparity to display a multidimensional digital image 1010 for user U.

Create depth map 720B takes source images, left image 810L and right image 810R of scene S and makes a grey scale image through an algorithm. For example, this provides more information as volume, texture and lighting are more fully defined. Once a depth map 720B is generated then the parallax can be tightly controlled as via control of the viewing angle A for the generation of multidimensional image 1010 used in the final output stereo image. With a depth map more than two frames or images from image capture devices 331-334 can be used. For this computer system 10 may limit the number of output frames to four without going to a depth map. If we use four from a depth map or two from a depth map, we are not limited by the intermediate camera positions. Note the outer image capture devices 331 and 332, 333, or 334 are locked into the interpupillary distance (IPD) of the observer or user U viewing display 208. The reasons we may stick only to two is to minimize cross talk between images. Two images, image capture devices 331 and 332, 333, or 334 of computer system 10 produces source images, left image 810L and right image 810R of scene S the desired stereogram for the user to generate multidimensional image 1010.

When using a depth map technique, frames are generated by a virtual camera set at different angles. The angles for this device are set so the outer extremes correspond to the angles subtend by the human visual system, i.e., the interpupillary distance.

It is contemplated herein that the way a depth map works is to utilize images(n) of scene S from capture devices 331-334 (n devices) and make a grey scale image through an algorithm. In some instances, this provides more information as volume, texture and lighting are more fully defined. Once a depth map is generated then the parallax can be tightly controlled as the system controls the viewing angle for the generation of the frames used in the final output (left and right) stereo images. With a depth map more than two frames can be used. For this computer system 10, display 208, and application program(s) 206 parameters can limit the number of output frames to four without going to a depth map. If we use four from a depth map or two from a depth map, computer system 10, display 208, and application program(s) 206 are not limited by the intermediate camera positions of capture devices 331-334. However, computer system 10, display 208, and application program(s) 206 is locked into the interpupillary distance of the observer, user U. The reasons or rationale for using only two images(n) of scene S from capture devices 331-334 (n devices) is to minimize cross talk between images. Two images on computer system 10, capture devices 331-334, display 208, and application program(s) 206 produces the desired stereogram for the user U.

When using a depth map technique, frames are generated by a virtual camera set at different angles. The angles for computer system 10, capture devices 331-334, display 208, and application program(s) 206 are set so the outer extremes corresponding to the angles subtend by the human visual system, i.e., the interpupillary distance.

In block or step 725, computer system 10 via rectification application 720C (206) is configured to transforms each source image, left image 810L and right image 810R of scene S to align the identified key subject KS in the same pixel space. Horizontal and vertical alignment of each source image, left image 810L and right image 810R of scene S, requires a dimensional image format (DIF) transform. The DIF transform is a geometric shift that does not change the information acquired at each point in the source image, left image 810L and right image 810R of scene S, but can be viewed as a shift of each point in the source image, left image 810L and right image 810R of scene S, in Cartesian space (illustrated in FIG. 9). As a plenoptic function, the DIF transform is represented by the equation:

$$P'(u, v) \times P'(\theta, \varphi) = [P_{u,v} + \Delta_{u,v}] \times [P_{\theta,\varphi} + \Delta_{\theta,\varphi}]$$

Where $\Delta u, v = \Delta \theta \phi$

In the case of a digital image source, the geometric shift corresponds to a geometric shift of pixels which contain the plenoptic information, the DIF transform then becomes:

$$(\text{Pixel})_{x,y} = (\text{Pixel})_{x,y} + \Delta_{x,y}$$

Moreover, computer system 10 via frame establishment application 206 may also apply a geometric shift to the background and or foreground using the DIF transform. The background and foreground may be geometrically shifted according to the depth of each relative to the depth of the key subject KS identified by the depth map 720B of the source image. Controlling the geometrical shift of the background and foreground relative to the key subject KS controls the motion parallax of the key subject KS. As described, the apparent relative motion of the key subject KS against the background or foreground provides the observer with hints about its relative distance. In this way, motion parallax is controlled to focus objects at different depths in a displayed scene to match vergence and stereoscopic retinal disparity demands to better simulate natural viewing conditions. By adjusting the focus of key subjects KS in a scene to match their stereoscopic retinal disparity (an intraocular or interpupillary distance width IPD (distance between pupils of human visual system), the cues to ocular accommodation and vergence are brought into agreement.

In block or step 730, computer system 10 via interphasing application 730 (206) is configured to interphase columns of pixels of each source image, left image 810L and right image 810R of scene S to generate a multidimensional digital image aligned to the key subject KS point and within a calculated parallax range. Interphasing application 730 may be configured to takes sections, strips, rows, or columns of pixels, such as column 1002 of the source images, left image 810L and right image 810R of scene S and layer them alternating between column 1002 of left image 810L and column 1002 of right image 810R and reconfigures or lays them out in series side-by-side interlaced, such as in repeating series 1004 two columns wide, and repeats this configuration for all layers of the source images, left image 810L and right image 810R of scene S to generate multidimensional image 1010 with column 1002 dimensioned to be one pixel 550. For interlacing stereo pair images (see codeproject.com as example) relative to lenticular lens 540 (or other viewing functionality, such as barrier screen, lenticular, parabolic, overlays, waveguides, micro-optical material (MOM), black line, digital black line and the like (at least one layer). Three-Dimensional Display Technology, pages 1-80, by Jason Geng of other display techniques that may be utilized to produce a multidimensional digital image on display 208) overlapping therein each images(n) of scene S from capture devices 331-334 (n devices).

This configuration provides multidimensional image 1010 a dimensional match with left and right pixel 550L/R light passes through lenticular lens 540 and bends or refracts to provide 3D viewing of multidimensional image 1010 on display 208 to left eye LE and right eye RE a viewing distance VD from pixel 550.

It is contemplated herein that column 1002 of the source images, left image 810L and right image 810R match size and configuration of pixel 550 of display 208.

Figure 10:
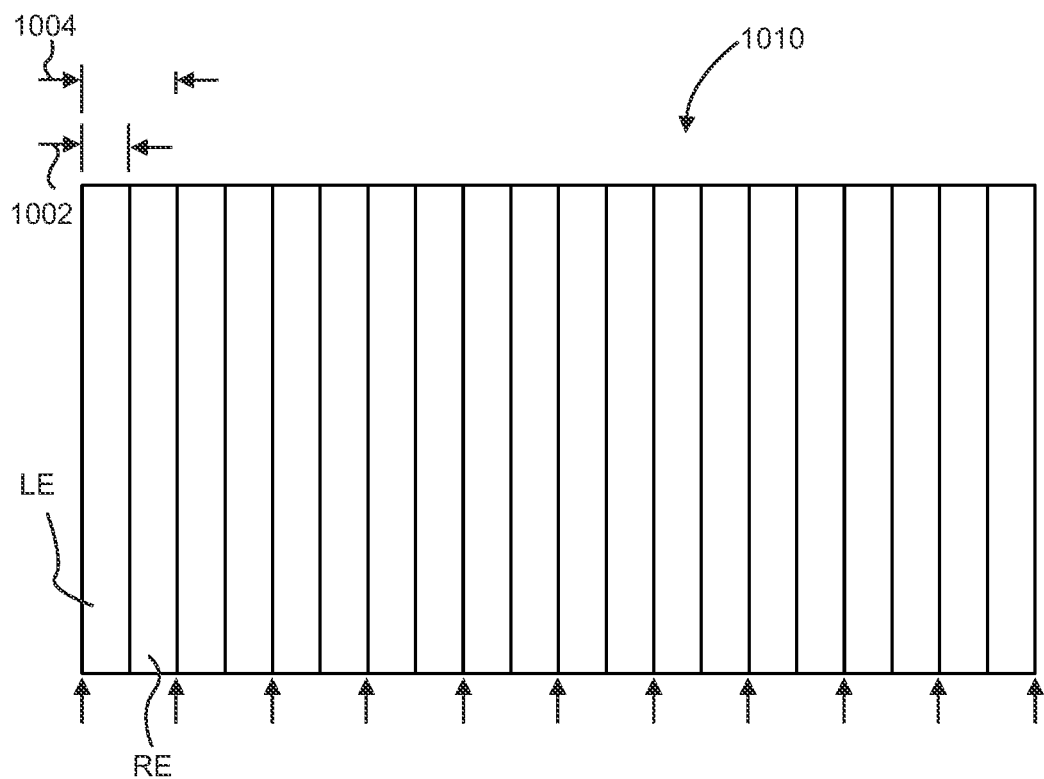
FIG. 10 is a diagram illustration of an exemplary embodiment of a pixel interphase processing of images (frames), such as in FIG. 8A according to select embodiments of the instant disclosure.

Alternatively, computer system 10 via interphasing application 730 (206) is configured to interphase columns of pixels of each source image, left image 810L via image capture devices 331, center image 810C via image capture devices 332 or 333, and right image 810R via image capture devices 333 or 334 of scene S to generate a multidimensional digital image aligned to the key subject KS point and within a calculated parallax range. As shown in FIG. 10, interphasing application 730 may be configured to takes sections, strips, rows, or columns of pixels, such as column 1002 of the source images, left image 810L, center image 810C, and right image 810R of scene S and layer them alternating between column 1002 of left image 810L, (or column 1002 of center image 810C,) and column 1002 of right image 810R and reconfigures or lays them out in series side-by-side interlaced, such as in repeating series 1004 two to three columns wide, and repeats this configuration for all layers of the source images, left image 810L, (or center image 810C), and right image 810R of scene S to generate multidimensional image 1010 with column 1002 dimensioned to be one pixel 550 wide.

This configuration provides multidimensional image 1010 a dimensional match with center pixel 550C light passes through lenticular lens 540 as center light 560C to provide 2D viewing of multidimensional image 1010 on display 208 to left eye LE and right eye RE a viewing distance VD from pixel 550 and left and right pixel 550L/R light passes through lenticular lens 540 and bends or refracts to provide 3D viewing of multidimensional image 1010 on display 208 to left eye LE and right eye RE a viewing distance VD from pixel 550.

Now given the multidimensional image 1010, with the associated circle of confusion we move to observe the viewing side of the device.

It is contemplated herein that additional image editing may be performed by utilizing computer system 10, display 208, and application program(s) 206 to crop, zoom, align or perform other edits thereto each image(n) of scene S from capture devices 331-334 (n devices) to enable images(n) of scene S to display a multidimensional digital image of scene S on display 208 for different dimensions of displays 208. It is contemplated herein that computer system 10, display 208, and application program(s) 206 may be responsive in that computer system 10 may execute an instruction to size each images(n) of scene S to fit the dimensions of a given display 208. Moreover, computer system 10 and application program(s) 206 may include edits, such as frame enhancement, layer enrichment, feathering, (Photoshop or Acorn photo or image tools), to smooth or fill in the images (n) together, and other software techniques for producing 3D effects to display 3-D multidimensional image of scene S thereon display 208. It is contemplated herein that a computer system 10, display 208, and application program(s) 206 may perform an algorithm or set of steps to automatically or manually edit or apply effects to at least two images(n) of scene S from capture devices 331-334.

It is recognized herein that steps 720-730, may be performed by computer system 10 via image manipulation application 206 utilizing distinct and separately located computer systems 10, such as one or more user systems 220, 222, 224 and application program(s) 206 performing steps herein. For example, using an image processing system remote from image capture system, and from image viewing system, steps 720-735 may be performed remote from scene S via computer system 10 and application program(s) 206 and communicating between user systems 220, 222, 224 and application program(s) 206 via communications link 240 and/or network 250, or via wireless network, such as 5G, computer systems 10 and application program(s) 206 via more user systems 220, 222, 224. Here, computer system 10 via image manipulation application 206 may manipulate left image 810L and right image 810R of scene S to generate a multidimensional digital image aligned to the key subject KS point and transmit display multidimensional image 1010 to one more user systems 220, 222, 224 via communications link 240 and/or network 250, or via wireless network, such as 5G computer systems 10 and application program(s) 206.

Moreover, it is recognized herein that steps 720-730, may be performed by computer system 10 via image manipulation application 206 utilizing distinct and separately located computer systems 10 positioned on the vehicle. For example, using an image processing system remote from image capture system, steps 720-735 via computer system 10 and application program(s) 206 computer systems 10 may manipulate left image 810L and right image 810R of scene S to generate a multidimensional digital image 1010 aligned to the key subject KS point. Here, computer system 10 via image manipulation application 206 may utilize multidimensional image 1010 to navigate the vehicle through scene S.

In block or step 720, utilizing computer system 10, display 208, and application program(s) 206 to crop, zoom, align or perform other edits thereto each image(n) of scene S from capture devices 331-334 (n devices) to enable images(n) of scene S to display a multidimensional digital image of scene S on display 208 for different dimensions of displays 208. It is contemplated herein that computer system 10, display 208, and application program(s) 206 may be responsive in that computer system 10 may execute an instruction to size each images(n) of scene S to fit the dimensions of a given display 208. Moreover, computer system 10 and application program(s) 206 may include edits, such as frame enhancement, layer enrichment, feathering, (Photoshop or Acorn photo or image tools), to smooth or fill in the images (n) together, and other software techniques for producing 3D effects to display 3-D multidimensional image 1010 of scene S thereon display 208. It is contemplated herein that a computer system 10, display 208, and application program(s) 206 may perform an algorithm or set of steps to automatically or manually edit or apply effects to at least two images(n) of scene S from capture devices 331-334.

In block or step 735, computer system 10 via output application 730 (206) may be configured to display multidimensional image 1010 on display 208. Multidimensional image 1010 may be displayed via left and right pixel 550L/R light passes through lenticular lens 540 and bends or refracts to provide 3D viewing of multidimensional image 1010 on display 208 to left eye LE and right eye RE a viewing distance VD from pixel 550.

In block or step 735, utilizing computer system 10, display 208, and application program(s) 206 settings to configure each images(n) (L&R segments) of scene S from capture devices 331-334 (n devices) simultaneously with Key Subject aligned between images for binocular disparity for display/view/save multi-dimensional digital master image(s) 1010 on display 208, wherein a difference in position of each images(n) of scene S from capture devices 331-334 (n devices) relative to key subject KS plane introduces a (left and right) binocular disparity to display a multidimensional digital image 1010 on display 208 to enable user U, in block or step 735 to view multidimensional digital image on display 208.

Moreover, in block or step 735, computer system 10 via output application 730 (206) may be configured to display multidimensional image(s) 1010 on display 208 for one more user systems 220, 222, 224 via communications link 240 and/or network 250, or 5G computer systems 10 and application program(s) 206.

It is contemplated herein that computer system 10 via output application 730 (206) may be configured to enable display of multidimensional digital image(s) on display 208 to enable a plurality of user U, in block or step 735 to view multidimensional digital image 1010 on display 208 live or as a replay/rebroadcast.

It is recognized herein that step 735, may be performed by computer system 10 via output application 730 (206) utilizing distinct and separately located computer systems 10, such as one or more user systems 220, 222, 224 and application program(s) 206 performing steps herein. For example, using an output or image viewing system, remote from scene S via computer system 10 and application program(s) 206 and communicating between user systems 220, 222, 224 and application program(s) 206 via communications link 240 and/or network 250, or via wireless network, such as 5G, computer systems 10 and application program(s) 206 via more user systems 220, 222, 224. Here, computer system 10 output application 730 (206) may receive manipulated plurality of two digital images of scene S as left image 810L and right image 810R of scene S and display left image 810L and right image 810R of scene S to generate a multidimensional digital image aligned to the key subject KS point and to display multidimensional image 1010 to one more user systems 220, 222, 224 via communications link 240 and/or network 250, or via wireless network, such as 5G computer systems 10 and application program(s) 206.

Figure 11:
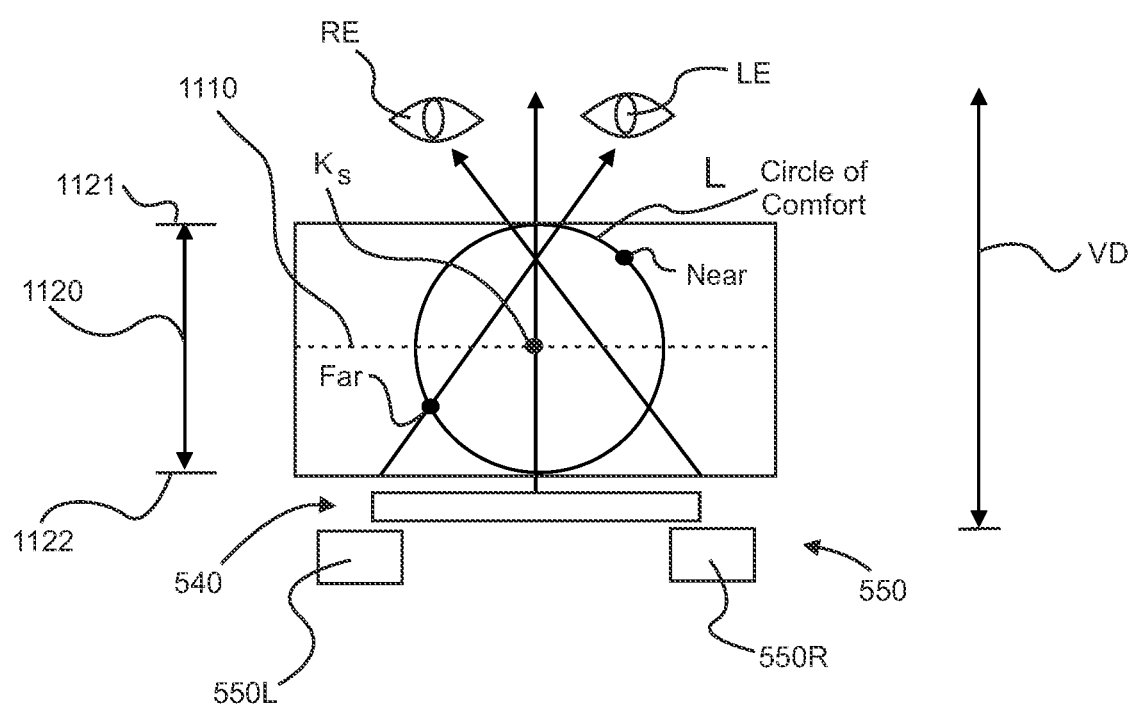
FIG. 11 is a top view illustration of an exemplary embodiment of viewing a multidimensional digital image on display with the image within the Circle of Comfort, proximate Horopter arc or points, within Panum area, and viewed from viewing distance.

Referring now to FIG. 11, there is illustrated by way of example, and not limitation a representative illustration of Circle of Comfort CoC fused with Horopter arc or points and Panum area. Horopter is the locus of points in space that have the same disparity as fixation, Horopter arc or points. Objects in the scene that fall proximate Horopter arc or points are sharp images and those outside (in front of or behind) Horopter arc or points are fuzzy or blurry. Panum is an area of space, Panum area 1120, surrounding the Horopter for a given degree of ocular convergence with inner limit 1121 and an outer limit 1122, within which different points projected on to the left and right eyes LE/RE result in binocular fusion, producing a sensation of visual depth, and points lying outside the area result in diplopia-double images. Moreover, fuse the images from the left and right eyes for objects that fall inside Panum's area, including proximate the Horopter, and user U will we see single clear images. Outside Panum's area, either in front or behind, user U will see double images.

It is recognized herein that computer system 10 via image capture application 206, image manipulation application 206, image display application 206 may be performed utilizing distinct and separately located computer systems 10, such as one or more user systems 220, 222, 224 and application program(s) 206. Next, via communications link 240 and/or network 250, wireless, such as 5G second computer system 10 and application program(s) 206 may transmit sets of images(n) of scene S from capture devices 331-334 (n devices) relative to key subject plane introduces a (left and right) binocular disparity to display a multidimensional digital image on display 208 to enable a plurality of user U, in block or step 735 to view multidimensional digital image on display 208 live or as a replay/rebroadcast.

As an example a basket, batter's box, goal, concert singer, instructors, entertainers, lead instrument, or other entertainment or event space could be configured with capture devices 331-334 (n devices) to enable display of multidimensional digital image(s) on display 208 to enable a plurality of user U, in block or step 735 to view multidimensional digital image on display 208 live or as a replay/rebroadcast.

Moreover, FIG. 11 illustrates display and viewing of multidimensional image 1010 on display 208 via left and right pixel 550L/R light of multidimensional image 1010 passes through lenticular lens 540 and bends or refracts to provide 3D viewing of multidimensional image 1010 on display 208 to left eye LE and right eye RE a viewing distance VD from pixel 550 with near object, key subject KS, and far object within the Circle of Comfort CoC and Circle of Comfort CoC is proximate Horopter arc or points and within Panum area 1120 to enable sharp single image 3D viewing of multidimensional image 1010 on display 208 comfortable and compatible with human visual system of user U.

With respect to the above description then, it is to be realized that the optimum dimensional relationships, to include variations in size, materials, shape, form, position, movement mechanisms, function and manner of operation, assembly and use, are intended to be encompassed by the present disclosure.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Moreover, the present disclosure has been described in detail, it should be understood that various changes, substitutions and alterations can be made thereto without departing from the spirit and scope of the disclosure as defined by the appended claims. Accordingly, the present disclosure is not limited to the specific embodiments illustrated herein but is limited only by the following claims.

The invention claimed is:

1. A combined system to capture a plurality of two dimensional digital source images of a scene by a user, process the images, and view a multidimensional digital image, the combined system comprising:
- A smart phone with a memory device for storing an instruction;
- a processor in communication with said memory device configured to execute said instruction;
- a plurality of digital image capture devices in communication with said processor and each image capture device configured to capture a digital image of the scene, said plurality of digital image capture devices positioned linearly in series within approximately an interpupillary distance width, wherein a first digital image capture devices is centered proximate a first end of said interpupillary distance width, a second digital image capture devices is centered on a second end of said interpupillary distance width, and any remaining said plurality of digital image capture devices are evenly spaced therebetween, said plurality of digital image capture devices captures a pair of digital images of the scene by two of said plurality of digital image capture devices;
- said processor executes an instruction to control a parallax and a depth of field of said pair of digital images of the scene and generate a multidimensional image of the scene; and
- a display in communication with said processor, said display configured to display said multidimensional digital image,
- wherein said display is configured as a plurality of pixels having a refractive element integrated therein, said refractive element having a plurality of repeating series of continuous sub-elements aligned as a single layer therewith said plurality of pixels,
- wherein each of said plurality of repeating series of continuous sub-elements is configured having a cross-section shaped as a single continuous layer having repeating flat sections and trapezoid sections, each of said trapezoid sections having an incline angle and a decline angle;
- wherein said processor executes an instruction to generate a message on said display to instruct the user to position said plurality of digital image capture devices a distance from a key subject of the scene;
- wherein said processor executes an instruction to automatically select a key subject point in two of said plurality of digital images and said processor aligns said images about said key subject point; and
- wherein said processor executes an instruction to display said digital image of the scene on said display.

2. The system of claim 1, wherein said plurality of digital image capture devices is four digital image capture devices evenly spaced between said interpupillary distance width.

3. The system of claim 1, wherein said plurality of digital image capture devices is three with one of said digital image capture devices positioned on a center line.

4. The system of claim 1, wherein said plurality of digital image capture devices is two digital image capture devices.

5. The system of claim 1, wherein said processor executes an instruction to display a message on said display to instruct the user to select two of said plurality of digital image capture devices.

6. The system of claim 1, wherein said processor executes an instruction to enable the user to select a key subject point in two of said plurality of digital images via an input from said display and said processor aligns said two of said plurality of digital images about said key subject point.

7. The system of claim 1, wherein said processor executes an instruction to perform a horizontal image translation of said two of said plurality of digital images about a key subject point, wherein said two of said digital images are aligned with said key subject point overlapping in each of said two of said plurality of digital images of the scene.

8. The system of claim 1, wherein said processor executes an instruction to generate a depth map from said two of said plurality of digital images of the scene.

9. The system of claim 7, wherein said processor executes an instruction to perform an interphasing of said two of said plurality of digital images relative to said key subject point to introduce a binocular disparity therein a multidimensional digital image.

10. The system of claim 9, wherein said processor executes an instruction to display said multidimensional digital image on said display.

11. The system of claim 2, wherein said display is configured to display said multidimensional digital image utilizes at least one layer selected from the group consisting of a lenticular lens, a barrier screen, a parabolic lens, an overlay, a waveguide, and combinations thereof.

12. A method of generating a multidimensional digital image of a scene from at least two 2D (two dimensional) digital images for a user, said method comprising the steps of:
- providing a smart phone with combined systems of image capture, image processing and image display having a memory device for storing an instruction, a processor in communication with said memory device and configured to execute said instruction, a plurality of digital image capture devices in communication with said processor and each image capture device configured to capture a digital image of the scene, said plurality of digital image capture devices positioned linearly in series within approximately an interpupillary distance, wherein a first digital image capture devices is centered proximate a first end of said interpupillary distance, a second digital image capture devices is centered on a second end of said interpupillary distance, and any remaining said plurality of digital image capture devices are evenly spaced therebetween, and a display in communication with said processor, said display configured to display the multidimensional digital image,
- wherein said display is configured as a plurality of pixels having a refractive element integrated therein, said refractive element having a plurality of repeating series of continuous sub-elements aligned as a single layer therewith said plurality of pixels;
- wherein each of said plurality of repeating series of continuous sub-elements is configured having a cross-section shaped as a single continuous layer having repeating flat sections and trapezoid sections, each of said trapezoid sections having an incline angle and a decline angle;
- capturing a pair of digital images of the scene by two of said plurality of digital image capture devices;
- executing an instruction to control a parallax and a depth of field of said pair of digital images of the scene and generate a multidimensional image of the scene;
- generating a message on said display to instruct the user to position said plurality of digital image capture devices a distance from a key subject of the scene;

selecting a key subject point in two of said plurality of digital images and said processor aligns said two of said plurality of digital images about said key subject point; and displaying the multidimensional digital image on said display.

13. The method of claim 1, further comprising the step of performing a horizontal image translation of said two of said plurality of digital images about said key subject point, wherein said two of said plurality of digital images are aligned with said key subject point overlapping in each of two of said plurality of digital images of the scene.

14. The method of claim 13, further comprising the step of generating a depth map from said two of said plurality of digital images of the scene.

15. The method of claim 13, further comprising the step of performing an interphasing of said two of said plurality of digital images relative to said key subject point to introduce a binocular disparity therein the multidimensional digital image.

16. The method of claim 15, further comprising the step of displaying said multidimensional digital image on said display.

17. The method of claim 15, further comprising the step of automatically selecting a key subject point in two of said plurality of digital images and said processor aligning said images about said key subject point.

18. The method of claim 17, further comprising the step of automatically selecting a parallax and a depth of field of said pair of digital images of the scene and generating a multidimensional image of the scene.

19. The method of claim 18, further comprising the step of displaying said multidimensional digital image on said display.

* * * * *